(12) United States Patent
Huang

(10) Patent No.: US 12,554,189 B2
(45) Date of Patent: Feb. 17, 2026

(54) FRONT CAMERA ASSEMBLING METHOD AND ASSEMBLING STRUCTURE, AND ELECTRONIC DEVICE

(71) Applicant: HONOR DEVICE CO., LTD., Guangdong (CN)

(72) Inventor: Fubo Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/560,749

(22) PCT Filed: Apr. 21, 2023

(86) PCT No.: PCT/CN2023/089846
§ 371 (c)(1),
(2) Date: Nov. 14, 2023

(87) PCT Pub. No.: WO2024/045648
PCT Pub. Date: Mar. 7, 2024

(65) Prior Publication Data
US 2025/0189879 A1 Jun. 12, 2025

(30) Foreign Application Priority Data
Aug. 30, 2022 (CN) .......................... 202211047506.9

(51) Int. Cl.
*G03B 30/00* (2021.01)
*G02B 7/02* (2021.01)
*H04N 23/57* (2023.01)

(52) U.S. Cl.
CPC ............. *G03B 30/00* (2021.01); *G02B 7/025* (2013.01); *H04N 23/57* (2023.01)

(58) Field of Classification Search
CPC ........ G03B 30/00; G02B 7/025; H04N 23/57; H04M 1/0266; H04M 1/0264; H04M 1/026
See application file for complete search history.

(56) References Cited

U.S. PATENT DOCUMENTS

2017/0187934 A1* 6/2017 Kwak ................... G06F 1/1686
2021/0408433 A1* 12/2021 Kim ..................... H10K 59/871
(Continued)

FOREIGN PATENT DOCUMENTS

CN 107357021 A 11/2017
CN 207135141 U 3/2018
(Continued)

OTHER PUBLICATIONS

Machine Translation of CN113766094, 2021.*
(Continued)

*Primary Examiner* — Kelly L Jerabek
(74) *Attorney, Agent, or Firm* — Fish & Richardson P.C.

(57) ABSTRACT

: This application discloses a front camera assembling method and assembling structure, and an electronic device. The assembling method includes: providing a middle frame; assembling the middle frame and a touchscreen into an integral structure; and moving a camera body by using a visual positioning system, to enable a lens to extend into a camera hole and to be disposed in a centering manner, and fastening the camera body in an accommodation groove. In the front camera assembling method provided in this application, after the lens and the camera hole are accurately positioned by using the visual positioning system, the camera body is fastened to the middle frame.

20 Claims, 16 Drawing Sheets

(56) References Cited

U.S. PATENT DOCUMENTS

| | | | |
|---|---|---|---|
| 2021/0409527 A1 | 12/2021 | Li et al. | |
| 2022/0078269 A1* | 3/2022 | Qu | H04M 1/026 |
| 2022/0365322 A1 | 11/2022 | Lin et al. | |
| 2024/0214681 A1* | 6/2024 | Xia | H04N 23/54 |
| 2024/0272605 A1* | 8/2024 | Xin | G05B 19/41805 |
| 2024/0422411 A1* | 12/2024 | Brinks | H04N 23/55 |

FOREIGN PATENT DOCUMENTS

| | | |
|---|---|---|
| CN | 108957819 A | 12/2018 |
| CN | 110809072 A | 2/2020 |
| CN | 210225470 U | 3/2020 |
| CN | 210986180 U | 7/2020 |
| CN | 212367386 U | 1/2021 |
| CN | 112543269 A | 3/2021 |
| CN | 112839144 A | 5/2021 |
| CN | 213244069 U | 5/2021 |
| CN | 113746958 A | 12/2021 |
| CN | 113766094 A | 12/2021 |
| CN | 215818222 U | 2/2022 |
| CN | 114222045 A | 3/2022 |
| CN | 216122574 U | 3/2022 |
| CN | 115174796 A | 10/2022 |
| WO | 2021004148 A1 | 1/2021 |
| WO | 2021221464 A1 | 11/2021 |

OTHER PUBLICATIONS

Pu, "Research on Control System of Camera Module," Dissertation for the Master Degree, China Jiliang University, Nov. 2019, 59 pages (with English abstract).

* cited by examiner

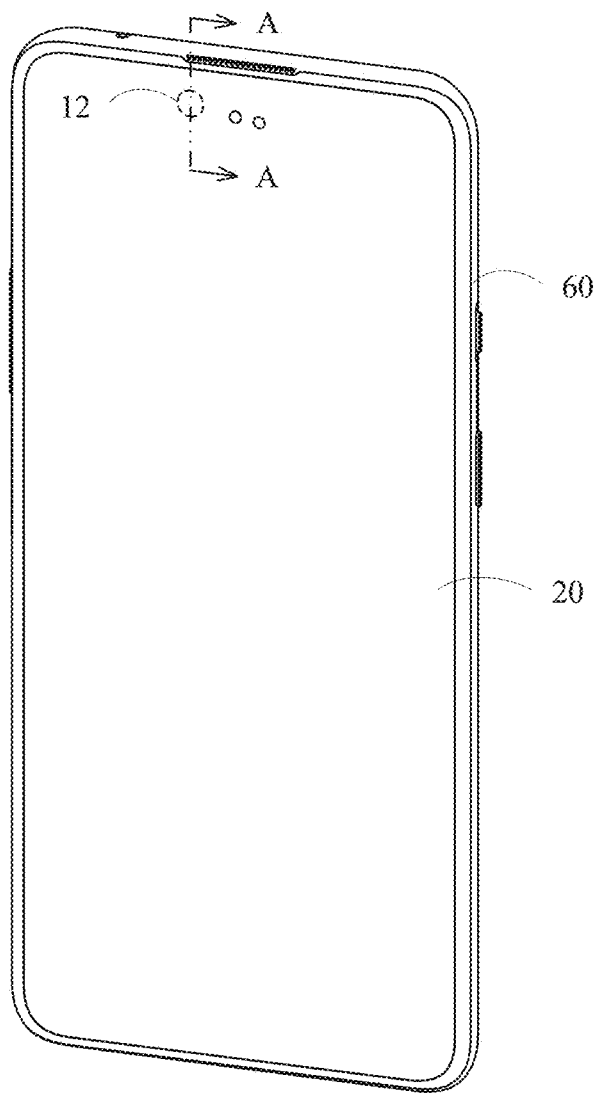
FIG. 1 -- PRIOR ART --
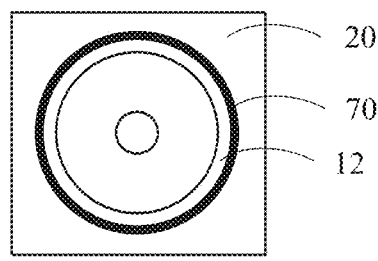
FIG. 2 -- PRIOR ART --

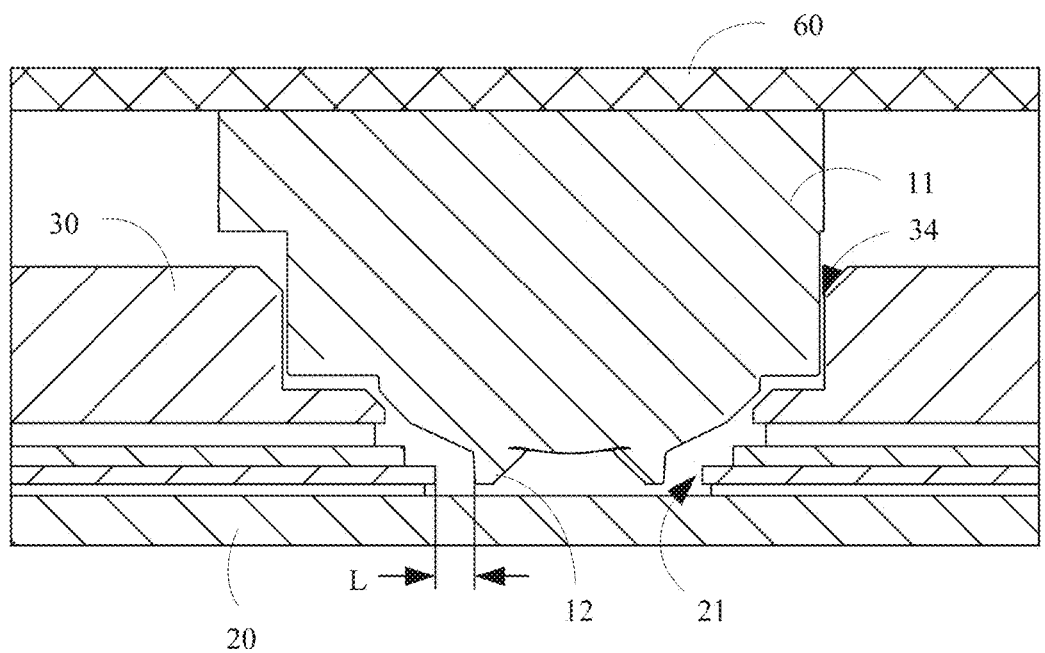
FIG. 3 -- PRIOR ART --
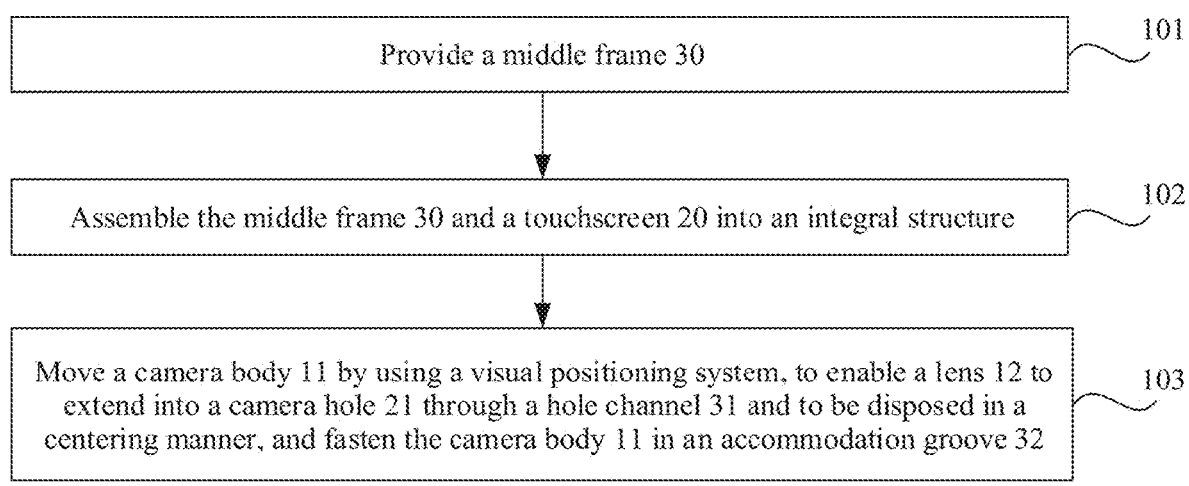
FIG. 4

FRONT CAMERA ASSEMBLING METHOD AND ASSEMBLING STRUCTURE, AND ELECTRONIC DEVICE

CROSS-REFERENCE TO RELATED APPLICATIONS

This application is a national stage of International Application No. PCT/CN2023/089846, filed on Apr. 21, 2023, which claims priority to Chinese Patent Application No. 202211047506.9, filed on Aug. 30, 2022. The disclosures of the aforementioned applications are hereby incorporated by reference in their entireties.

TECHNICAL FIELD

This application relates to the technical field of shooting elements, and in particular to an electronic device with a front camera.

BACKGROUND

A minimum lens black edge of a front camera under a screen of an electronic terminal device is pursued in the current industry, to reduce an impact of the lens black edge on user's vision and increase a screen-to-body ratio of the electronic device. The lens black edge is usually limited by a gap size between a lens and a camera hole. A larger gap size between the lens and the camera hole indicates a wider lens black edge. This causes poorer visual experience for a user and a smaller display region of the screen.

For a front camera assembling structure in a related technology, a position at which a lens is installed within a camera hole is determined by a limiting groove on a middle frame and an outer wall of a camera body. This causes a plurality of parts associated and assembled between the lens and the camera hole, a long size chain, and a large cumulative tolerance that is finally formed. Therefore, an aperture of the camera hole is to be designed to be relatively large, to meet eccentricity of the lens in the camera hole.

However, a relatively large camera hole increases a gap size between the camera hole and the lens. Further, an impact of a lens black edge on user's vision cannot be reduced, and it is difficult to increase a screen-to-body ratio of an electronic device. In addition, matching and installation of the limiting groove on the middle frame and the outer wall of the camera body increases difficulties in processing and assembling the front camera.

SUMMARY

This application is intended to provide a front camera assembling method and assembling structure, and an electronic device. After a lens and a camera hole are accurately positioned by using a visual positioning system, a camera body is fastened to a middle frame, to reduce a quantity of parts associated and assembled between the lens and the camera hole to the minimum extent, shorten a size chain to the minimum extent, and an aperture of the camera hole is further designed to be small. Therefore, a gap size between the camera hole and the lens is reduced, an impact of a lens black edge on user's vision is reduced, and a screen-to-body ratio of the electronic device is increased. In addition, processing precision of an upper limiting groove on the middle frame and an outer wall of the camera body may not be considered, and a precision requirement for installing the middle frame onto a touchscreen is also reduced, reducing overall difficulties in processing and assembling the front camera.

According to a first aspect, this application provides a front camera assembling method. The method includes:
  providing a middle frame, where the middle frame includes an accommodation groove that accommodates a camera body, a size of the accommodation groove meets a centering adjustment allowance that is of a lens of the camera body and a camera hole of a touchscreen and that exists when the camera body is assembled;
  assembling the middle frame and the touchscreen into an integral structure, where the integral structure includes a hole channel connecting the accommodation groove and the camera hole; and
  moving the camera body by using a visual positioning system, to enable the lens to extend into the camera hole through the hole channel and to be disposed in a centering manner, and fastening the camera body in the accommodation groove.

In the front camera assembling method provided in this application, after the lens and the camera hole are accurately positioned by using the visual positioning system, the camera body is fastened to the middle frame. In an entire assembly process, only an appearance tolerance of the lens, a tolerance of the camera hole, and an assembly tolerance of the visual positioning system need to be considered, to reduce a quantity of parts associated and assembled between the lens and the camera hole to the minimum extent, shorten a size chain to the minimum extent, and achieve a minimum cumulative tolerance, and an aperture of the camera hole may be further designed to be small. Therefore, a gap size between the camera hole and the lens is reduced, an impact of a lens black edge on user's vision is reduced, and a screen-to-body ratio of the electronic device is increased.

In a related technology, a gap size between the camera hole and the lens is usually between 0.3 mm and 0.5 mm. In this application, the gap size between the camera hole and the lens may be approximately 0.2 mm. This can reduce the impact of the lens black edge on user's vision.

In addition, the front camera assembling method provided in this application further has advantages of low processing and assembling difficulties, which is specifically described as follows. In the related technology, the limiting groove not only plays a role in fastening the camera body, but also plays a role in positioning the lens. Therefore, a requirement for size precision of the limiting groove and a requirement for size precision of an outer wall of the camera body are relatively high, and a requirement for installation precision of installing the middle frame onto the touchscreen is also relatively high. In contrast, for the accommodation groove and the camera body in this application, the lens and the camera hole are directly accurately positioned by using the visual positioning system, and the accommodation groove plays a role in only accommodating the camera body. Therefore, a requirement for size precision of the accommodation groove and a requirement for size precision of the outer wall of the camera body are relatively low. A size of the accommodation groove only needs to meet a centering adjustment allowance of the lens and the camera hole. In addition, a requirement for installation precision of installing the middle frame onto the touchscreen is also relatively low. Therefore, overall difficulties in processing and assembling the front camera are reduced.

In a possible design, a step of the fastening the camera body in the accommodation groove includes:

bonding and fastening the camera body in the accommodation groove.

Optionally, the camera body and the accommodation groove may be bonded on a side wall or a bottom wall of the accommodation groove.

Optionally, when the camera body is bonded to a groove wall of the accommodation groove, an adhesive or a double-sided adhesive may be used.

Optionally, the camera body is bonded to the accommodation groove in two implementations. In a first implementation, the adhesive or the double-sided adhesive is affixed to a bonding position of the camera body and/or the accommodation groove in advance, and then the camera body is bonded to the groove wall of the accommodation groove when the lens and the camera hole are disposed in a centering manner by using the visual positioning system. In a second implementation, after the lens and the camera hole are disposed in a centering manner by using the visual positioning system, a robotic arm of the visual positioning system is kept motionless, and the adhesive is injected into a gap between the camera body and the accommodation groove by using a glue dispensing device.

In a possible design, a step of the moving the camera body by using a visual positioning system, to enable the lens to extend into the camera hole through the hole channel and to be disposed in a centering manner, and fastening the camera body in the accommodation groove includes:

fastening the camera body to a camera support; and moving the camera support and the camera body by using the visual positioning system, to enable the lens to extend into the camera hole through the hole channel and to be disposed in a centering manner, and fastening the camera support to the middle frame, to enable the camera body to be fastened in the accommodation groove.

The camera support is fastened to the middle frame, to fasten the camera body in the accommodation groove. This fastening manner is implemented on the camera support and the middle frame. This may prevent direct contact with the camera body, preventing damage to the camera body during assembly and reducing material loss in an assembling phase. In addition, in a material loading phase, when the visual positioning system picks up the camera body, a sucked or clamped object is also the camera support. This also prevents direct contact with the camera body, and can effectively prevent damage to the camera body during material transfer, and further reduce material damage.

Optionally, the camera support is fastened to the camera body in a variety of manners, such as bonding by using the adhesive, soldering, snap-fitting, or connection by using the fastener.

In a possible design, a step of the fastening the camera body to a camera support includes:

bonding and fastening the camera body in an accommodation housing formed by a middle part that is of the camera support and that is convex.

By bonding and fastening the camera body in the accommodation housing, the accommodation housing may protect a part that is of the camera body and that is exposed out of the accommodation groove well, to prevent the camera body from being damaged due to a hit by another component during assembly.

In a possible design, a step of the fastening the camera support to the middle frame includes:

bonding and fastening the camera support to the middle frame.

The camera body may be fastened to the middle frame more firmly by using an adhesive without using another connection structure. This may improve integrity of a front camera assembling structure. In addition, size precision of another connection structure may not be considered when the adhesive is used for bonding, reducing processing and assembling difficulties.

In a possible design, two ends of the camera support are provided with first installation holes, the middle frame is correspondingly provided with second installation holes, and a step of the fastening the camera support to the middle frame includes:

disposing fasteners in the first installation hole and the second installation hole to fasten the camera support to the middle frame.

The camera support and the middle frame are locked by using the fasteners, helping to enable the front camera to be disassembled and repaired, and reassembled and reused.

After the camera support and the middle frame are bonded and pre-fastened, the camera support and the middle frame may be moved out of a position of the visual positioning system as a whole, and then locking by using the fasteners is performed at another position. This can improve efficiency of disposing in a centering manner by using the visual positioning system, and prevent the camera support and the middle frame from occupying the visual positioning system for a long time, reducing assembly efficiency. In addition, the camera support and the middle frame are bonded both by using an adhesive and connected by using the fasteners. This can ensure adequate connection strength between the camera support and the middle frame. To sum up, this embodiment has advantages of high assembly efficiency and a good anti-seismic effect.

Optionally, the fastener may be a screw or pin.

Specifically, the fastener is a screw, and a hole wall of the second installation hole is provided with a thread fitting the screw. When the screw is screwed in the second installation hole, a head of the screw is pressed at an orifice of the first installation hole.

Specifically, when the fastener is a pin, the second installation hole and the pin are in interference fit. When the pin is inserted into the second installation hole, a head of the pin is pressed at an orifice of the first installation hole.

In a possible design, a middle part of the camera support is concave to form a receiving groove, and a bottom groove wall of the receiving groove is provided with an avoidance hole, and a step of the fastening the camera body to a camera support includes:

enabling the lens to pass through the avoidance hole, and then bonding and fastening the camera body in the receiving groove.

In a possible design, a step of the fastening the camera support to the middle frame includes:

bonding and fastening an outer side of a groove wall of the receiving groove in the accommodation groove.

Optionally, a size of the outer side of the groove wall of the receiving groove is less than a size of the accommodation groove. This enables the receiving groove to be displaced in a horizontal direction in the accommodation groove, enabling the camera support to have an adjustment allowance in the horizontal direction relative to the middle frame when the lens and the camera hole are adjusted in a centering manner.

In a possible design, two ends of the camera support are provided with first installation holes, the middle frame is correspondingly provided with second installation holes, and a step of the fastening the camera support to the middle frame includes:

disposing fasteners in the first installation hole and the second installation hole to fasten the camera support to the middle frame.

After the camera support and the middle frame are bonded and pre-fastened, the camera support and the middle frame may be moved out of a position of the visual positioning system as a whole, and then locking by using the fasteners is performed at another position. This can improve efficiency of disposing in a centering manner by using the visual positioning system, and prevent the camera support and the middle frame from occupying the visual positioning system for a long time, reducing assembly efficiency. In addition, in this embodiment, the camera support and the middle frame are bonded both by using an adhesive and connected by using the fastener. This can ensure adequate connection strength between the camera support and the middle frame. In addition, because the camera support is fastened to the middle frame in an embedding manner, connection strength between the camera support and the middle frame is further increased.

According to a second aspect, this application provides a front camera assembling structure. The structure includes:
a camera body, including a lens located at a front end;
a touchscreen, provided with a camera hole for accommodating the lens; and
a middle frame, fastened to the touchscreen, where the middle frame is provided with an accommodation groove whose size meets a requirement for adjusting the lens and the camera hole in a centering manner, the accommodation groove communicates with the camera hole through a hole channel, the camera body is fastened in the accommodation groove, and the lens passes through the hole channel and is disposed in the camera hole in a centering manner.

For the front camera assembling structure provided in this application, an accommodation groove whose size meets a requirement for adjusting the lens and the camera hole at the middle frame in a centering manner. After the lens and the camera hole are accurately positioned by using a visual positioning system, the camera body is fastened in the accommodation groove, to reduce a quantity of parts associated and assembled between the lens and the camera hole to the minimum extent, shorten a size chain to the minimum extent, and achieve a minimum cumulative tolerance, and an aperture of the camera hole is further designed to be small. Therefore, a gap size between the camera hole and the lens is reduced, an impact of a lens black edge on user's vision is reduced, and a screen-to-body ratio of the electronic device is increased.

In addition, the accommodation groove in this application plays a role in only accommodating the camera body, and does not play a role in positioning the lens in the camera hole. Therefore, in this application, a requirement for size precision of the accommodation groove is relatively low, and the size of the accommodation groove only needs to meet a centering adjustment allowance of the lens and the camera hole. In addition, requirements for size precision of an outer wall of the camera body and installation precision of installing the middle frame onto the touchscreen are also relatively low. Therefore, difficulties in processing and assembling the front camera are generally reduced.

In a possible design, the assembling structure further includes:

a camera support, where the camera body is fastened to the middle frame by using the camera support.

Optionally, the camera support may be a flat plate structure, a housing structure, or a frame structure.

In a possible design, a middle part of the camera support is provided with a convex accommodation housing, and the camera body is fastened in the accommodation housing.

This enables the camera support to better protect the camera body, preventing the camera body from being damaged due to hit by another component during assembly.

In a possible design, edges of two ends of the camera support include inwardly flanged edges, and an adhesive is disposed on inner sides of the inwardly flanged edges to bond and fasten the camera support to the middle frame.

The inwardly flanged edge mainly has two functions. A first function is limiting an installation depth of the lens. A height of the inwardly flanged edge can determine a depth at which the lens extends into the camera hole, to increase precision of assembling the front camera. A second function is preventing the adhesive from spilling. The inwardly flanged edges leave space by supporting between the camera support and the middle frame. The space can accommodate the adhesive, to prevent the adhesive from being squeezed and spilling out of a gap between the camera support and the middle frame when the camera support and the middle frame are pressed.

In a possible design, the inwardly flanged edges are disposed to be half-circled on the edges of the ends of the camera support to surround the adhesive.

Therefore, the adhesive is surrounded, and the adhesive is further prevented from spilling.

In a possible design, two ends of the camera support are provided with first installation holes, the middle frame is provided with second installation holes corresponding to the first installation holes, and fasteners are disposed in the first installation hole and the second installation hole to fasten the camera support to the middle frame.

In a possible design, an aperture of the first installation hole is larger than an aperture of the second installation hole, to enable the camera support to have an adjustment allowance relative to the middle frame.

Because the aperture of the first installation hole is larger than the aperture of the second installation hole, the first installation hole can deviate relative to the second installation hole within a specific range. Therefore, when the lens and the camera hole are adjusted in a centering manner, the camera support has an adjustment allowance relative to the middle frame in a horizontal direction.

Optionally, an elastic buffer is disposed between the camera body and the middle frame, to buffer vibration and prevent the lens from being hit. In addition, the elastic buffer further has sealing and dust-proof functions, to prevent affecting lighting quality because dust and the like enter the camera.

Optionally, the elastic buffer may be a buffer foam, or may be made of another soft and elastic material. The elastic buffer may not be disposed.

In a possible design, a heat conductive agent is filled in a gap between the accommodation housing and the camera body.

The heat conductive agent may effectively fill the gap between the accommodation housing and the camera body, reduce heat resistance, improve a capability of heat conduction from the camera body to the accommodation housing, and make heat conduction more smooth and fast.

Optionally, the accommodation housing is a metal housing. In addition to being configured to protect the camera body, in this embodiment, the accommodation housing further has a heat conduction function and a shielding function.

In a possible design, a middle part of the camera support is provided with a concave receiving groove, a bottom groove wall of the receiving groove is provided with an avoidance hole for avoiding the lens, the camera body is fastened in the receiving groove, and an outer side of a groove wall of the receiving groove is fastened in the accommodation groove.

In a possible design, a size of an outer side of a groove wall of the receiving groove is smaller than a size of the accommodation groove, to enable the camera support to have an adjustment allowance relative to the middle frame.

In a possible design, two ends of the camera support are provided with first installation holes, the middle frame is provided with second installation holes corresponding to the first installation holes, and fasteners are disposed in the first installation hole and the second installation hole to fasten the camera support to the middle frame.

In a possible design, an aperture of the first installation hole is larger than an aperture of the second installation hole, to enable the camera support to have an adjustment allowance relative to the middle frame.

Optionally, an error-proof mechanism is provided on the camera support and the camera body.

When the camera support and the camera body are assembled, assembly efficiency and precision can be improved.

According to a third aspect, this application provides an electronic device. The electronic device includes the foregoing front camera assembling structure.

Optionally, the electronic device is a mobile phone, and the electronic device may alternatively be any one of a notebook computer, a tablet computer, and an electronic watch.

Because the foregoing front camera assembling structure is used for the electronic device in this application, the lens black edge of the front camera of the electronic device is smaller, the screen-to-body ratio is higher, and requirements for size precision and installation precision of parts are also relatively low, reducing overall difficulties in processing and assembling the electronic device and reducing manufacturing costs.

BRIEF DESCRIPTION OF DRAWINGS

FIG. 1 is a schematic diagram of an electronic device in a related technology;

FIG. 2 is a schematic diagram of a front camera in the related technology;

FIG. 3 is a sectional view of FIG. 1 in an A-A direction;

FIG. 4 is a flowchart of an example of a front camera assembling method according to an embodiment of this application;

Figure 5:
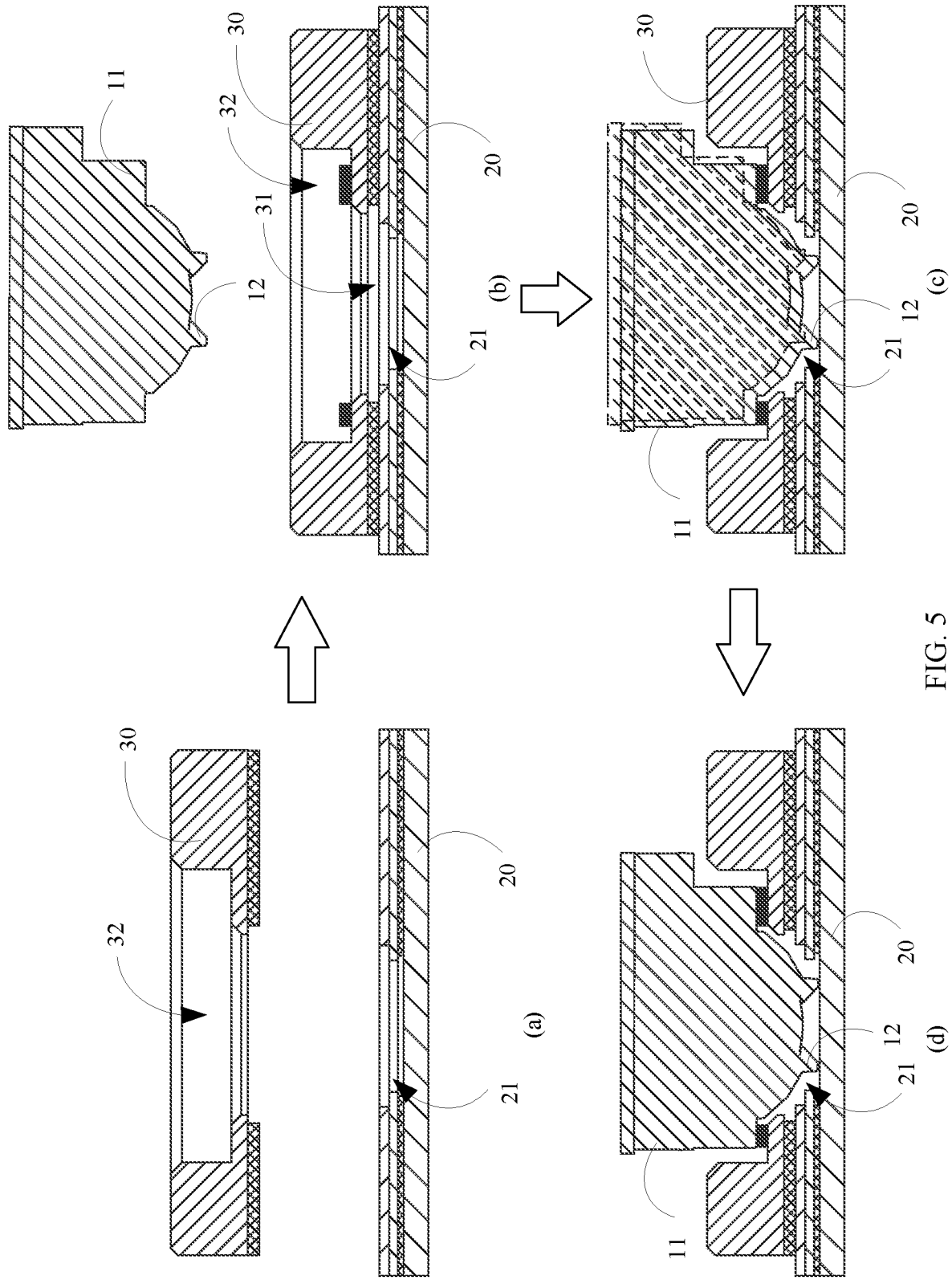
FIG. 5 is a schematic diagram of an example of a front camera assembling method according to an embodiment of this application.

Reference numerals:
11: camera body; 12: lens; 20. touchscreen; 21: camera hole; 30: middle frame; 31: hole channel; 32: accommodation groove; 33: second installation hole; 34: limiting groove; 35: elastic buffer; 40: camera support; 41: accommodation housing; 42: inwardly flanged edge; 43: first installation hole; 44: fastener; 45: receiving groove; 46: avoidance hole; 47: error-proof mechanism; 50: adhesive; 60: housing; 70: lens black edge.

DESCRIPTION OF EMBODIMENTS

The following describes an example of possible related content in embodiments of this application. Apparently, described embodiments are merely some but not all of the embodiments of this application.

In the description of this application, it should be noted that, unless otherwise expressly stipulated and defined, terms "install", "join", "connect", should be understood in a broad sense. For example, "connection" may be a firm connection, a detachable connection, or an integral connection; may be a mechanical connection, an electrical connection, or intercommunication; or may be a direct connection, an indirect connection through an intermediate medium, a connection between two elements, or interaction between two elements. A person of ordinary skill in the art may interpret specific meanings of the foregoing terms in this application according to specific cases.

In the description of this application, it should be understood that an orientation or a position relationship indicated by the terms "above", "below", "side", "inner", "outer", "top", "bottom", and the like is based on an orientation or a position relationship shown in the accompanying drawings, and is merely intended for ease of describing this application and simplifying description, but does not indicate or imply that a described apparatus or element needs to have a specific orientation or be constructed and operated in a specific orientation. Therefore, such terms shall not be understood as a limitation on this application.

It should be further noted that a same reference numeral in embodiments of this application represents a same component part or a same part or component. For a same part or component in embodiments of this application, only one part or component may be used as an example to mark a reference numeral in the figure. It should be understood that, for another same part or component, a reference numeral is also applicable.

In description of this application, it should be noted that the term "and/or" describes only an association relationship between associated objects, and indicates that three relationships may exist. For example, A and/or B may indicate the following three cases: Only A exists, both A and B exist, and only B exists.

FIG. 1 is a schematic diagram of an electronic device in a related technology. FIG. 2 is a schematic diagram of a front camera in the related technology.

As shown in FIG. 1 and FIG. 2, a minimum lens black edge 70 of a front camera under a screen of an electronic terminal device is pursued in the current industry, to reduce an impact of the lens black edge 70 on user's vision and increase a screen-to-body ratio of the electronic device.

FIG. 3 is a sectional view of FIG. 1 in an A-A direction. As shown in FIG. 3, the lens black edge 70 is usually limited by a gap size L between a lens 12 and a camera hole 21. As the gap size L between the lens 12 and the camera hole 21 is larger, the lens black edge 70 is wider. This causes poorer visual experience for a user and a smaller display region of the screen. Therefore, how to reduce the gap size L between the lens 12 and the camera hole 21 is an effective means for reducing or even eliminating the lens black edge 70. However, for a current front camera assembling structure, the gap size L between the lens 12 and the camera hole 21 cannot be minimized. Specific reasons are as follows.

FIG. 3 is a schematic diagram of a front camera assembling structure in the related technology. As shown in FIG. 3, a middle frame 30 is provided with a limiting groove 34 configured to limit a camera body 11, and the camera body 11 is directly clamped in and fastened in the limiting groove 34. When the camera body 11 is installed in position, the lens 12 just extends into the camera hole 21. It can be learned that a position at which the lens 12 is installed in the camera hole 21 is determined by the limiting groove 34 on the middle frame 30 and an outer wall of the camera body 11. This causes a plurality of parts associated and assembled between the lens 12 and the camera hole 21 and a long size chain. A touchscreen 20 is used as an example. The touchscreen 20 is a multilayer stacked structure and includes four or five size chains, and there are more than ten size chains between the lens 12 and the camera hole 21, resulting in a large cumulative tolerance that is finally formed. Therefore, an aperture of the camera hole 21 is to be designed to be relatively large, to meet eccentricity of the lens 12 in the camera hole 21.

However, a relatively large camera hole increases the gap size L between the camera hole 21 and the lens 12, so that an impact of the lens black edge 70 on the user's vision cannot be reduced, and it is difficult to increase the screen-to-body ratio of the electronic device.

In addition, in the front camera assembling structure in an original related technology, to ensure installation precision of the lens 12 in the camera hole 21, a requirement for size precision of the lens 12 and the camera hole 21 is to be high. In addition, because installation is performed by matching the limiting groove 34 on the middle frame 30 and the outer wall of the camera body 11, processing precision of the limiting groove 34 on the middle frame 30 and processing precision of the outer wall of the camera body 11 are to be high, and a requirement for precision of installing the middle frame 30 onto the touchscreen 20 is also to be high. Generally, difficulties in processing and assembling the front camera are increased.

Therefore, to resolve the foregoing technical problem, this application provides a front camera assembling method and assembling structure, and an electronic device. After the lens 12 and the camera hole 21 are accurately positioned by using a visual positioning system, the camera body 11 is fastened to the middle frame 30, to reduce a quantity of parts associated and assembled between the lens 12 and the camera hole 21 significantly, shorten a size chain significantly, and achieve a minimum cumulative tolerance, and an aperture of the camera hole 21 is further designed to be small. Therefore, a gap size L between the camera hole 21 and the lens 12 is reduced, an impact of a lens black edge 70 on user's vision is reduced, and a screen-to-body ratio of the electronic device is increased. In addition, the lens 12 and the camera hole 21 are directly accurately positioned, and then the camera body 11 and the middle frame 30 are fastened in another manner. Therefore, processing precision of an upper limiting groove 34 on the middle frame 30 and an outer wall of the camera body 11 may not be considered, and a precision requirement for installing the middle frame 30 onto the touchscreen 20 is also reduced, reducing overall difficulties in processing and assembling the front camera.

The front camera assembling method and assembling structure, and the electronic device provided in this application are described with reference to accompanying drawings.

FIG. 4 is a flowchart of an example of a front camera assembling method according to an embodiment of this application. FIG. 5 is a schematic diagram of an example of a front camera assembling method according to an embodiment of this application. (a) of FIG. 5 is a schematic diagram in which the middle frame 30 is not connected to the touchscreen 20; (b) of FIG. 5 is a schematic diagram of the middle frame 30 that is connected to the touchscreen 20, and the camera body 11; (c) of FIG. 5 is a schematic diagram of disposing the lens 12 and the camera hole 21 in a centering manner; and (d) of FIG. 5 is a schematic diagram of connection between the camera body 11 and the middle frame 30.

As shown in FIG. 4 and FIG. 5, an embodiment of this application provides a front camera assembling method. The assembling method includes the following steps.

Step 101: As shown in (a) of FIG. 5, provide the middle frame 30. The middle frame 30 is provided with an accommodation groove 32 that accommodates the camera body 11. A size of the accommodation groove 32 meets a centering adjustment allowance that is of the lens 12 of the camera body 11 and the camera hole 21 of the touchscreen 20 and that exists when the camera body 11 is assembled.

Step 102: As shown in (b) of FIG. 5, assemble the middle frame 30 and the touchscreen 20 into an integral structure.

The integral structure is provided with a hole channel 31 connecting the accommodation groove 32 and the camera hole 21.

Step 103: As shown in (c) and (d) of FIG. 5, move the camera body 11 by using the visual positioning system (not shown in the figure), to enable the lens 12 to extend into the camera hole 21 through the hole channel 31 and to be disposed in a centering manner, and fasten the camera body 11 in the accommodation groove 32.

It should be noted that the accommodation groove 32 in the embodiment of this application is different from a limiting groove 34 in the related technology. The accommodation groove 32 in the embodiment of this application plays a role in accommodating the camera body 11, and is also configured to increase an overlapping area of the middle frame 30 and the camera body 11, to coat more adhesive 50 for bonding and fastening, ensuring fastening strength between the camera body 11 and the middle frame 30. A requirement for size precision of the accommodation groove 32 in the embodiment of this application is less strict than a requirement for size precision of the limiting groove 34 in the related technology, and a shape of the accommodation groove 32 just needs to approximately meet an appearance of the camera body 11, to enable the camera body 11 to be smoothly disposed in the accommodation groove 32. In addition, the size of the accommodation groove 32 just needs to meet an adjustment allowance for centering of the lens 12 and the camera hole 21, to prevent interference to the camera body 11 by a groove wall of the accommodation groove 32 in centering of the lens 12 and the camera hole 21. Therefore, compared with the limiting groove 34 with a strict size requirement in the related technology, a size requirement for the accommodation groove 32 in this embodiment is relatively low, and a processing difficulty is relatively low.

Optionally, the visual positioning system mainly includes a robotic arm, a suction apparatus, a visual positioning apparatus, and an XYθ mobile platform. A working process in the embodiment of this application is as follows. A driving mechanism drives the robotic arm to move, to enable the suction apparatus to move the camera body 11 out of an external transporting apparatus. In this case, a first visual positioning apparatus performs fast image processing on the lens 12 of the camera body 11, records coordinate information of the lens 12, and a second visual positioning apparatus performs fast image processing on the camera hole 21 of the touchscreen 20, and records coordinate information of the camera hole 21. After analyzing the coordinate information of the lens 12 and the coordinate information of the camera hole 21, the first visual positioning apparatus gives feedback to the $XY^\theta$ mobile platform. The suction apparatus, driven by the XYθ mobile platform, adjusts an initial position of the camera body 11. The driving mechanism drives the robotic arm to move, to enable the suction apparatus to move the camera body 11 over the touchscreen 20. The robotic arm drives the suction apparatus and the camera body 11 to fall, and extends the lens 12 into the camera hole 21. Then the suction apparatus, driven by the XYθ mobile platform, adjusts a position of the camera body 11 slightly and accurately, to compensate for a coordinate error of the lens 12, enabling the lens 12 and the camera hole 21 to be disposed in a centering manner.

Optionally, when sucking the camera body 11 from the external transporting apparatus, the suction apparatus may first move the camera body 11 to a position adjustment tool. The position adjustment tool adjusts the position of the camera body 11 approximately, to enable the camera body 11 to be initially positioned. Then the suction apparatus sucks the camera body 11 from the position adjustment tool. Therefore, a centering error may be greatly reduced, and installation precision of the camera body 11 may be further increased.

Optionally, when the lens 12 and the camera hole 21 are disposed in a centering manner by using the visual positioning system, the camera body 11 is fastened in the accommodation groove 32 in a variety of fastening manners. The camera body 11 may be directly bonded in the accommodation groove 32, or the middle frame 30 is indirectly connected to the camera body 11 by using an additional component, such as a camera support 40 in a subsequent embodiment. The camera body 11 is pre-connected to the camera support 40, and then the middle frame 30 is bonded to the camera support 40 or connected by using fasteners 44. Refer to the following for more detailed description.

In the front camera assembling method provided in the embodiment of this application, after the lens 12 and the camera hole 21 are accurately positioned by using the visual positioning system, the camera body 11 is fastened to the middle frame 30. In an entire assembly process, only an appearance tolerance of the lens 12, a tolerance of the camera hole 21, and an assembly tolerance of the visual positioning system need to be considered, to reduce a quantity of parts associated and assembled between the lens 12 and the camera hole 21 to the minimum extent, shorten a size chain to the minimum extent, and achieve a minimum cumulative tolerance, and an aperture of the camera hole 21 may be further designed to be small. Therefore, a gap size between the camera hole 21 and the lens 12 is reduced, an impact of a lens black edge 70 on user's vision is reduced, and a screen-to-body ratio of the electronic device is increased.

In the related technology, the gap size L between the camera hole 21 and the lens 12 is usually from 0.3 mm to 0.5 mm. In the embodiment of this application, a gap size L' between the camera hole 21 and the lens 12 may be approximately 0.2 mm. This can reduce the impact of the lens black edge 70 on user's vision.

In addition, the embodiment of this application further has advantages of low processing and assembling difficulties. Specifically, in the related technology, the limiting groove 34 not only plays a role in fastening the camera body 11, but also plays a role in positioning the lens 12. Therefore, a requirement for size precision of the limiting groove 34 and a requirement for size precision of an outer wall of the camera body 11 are relatively high, and a requirement for installation precision of installing the middle frame 30 onto the touchscreen 20 is also relatively high. In contrast, for the accommodation groove 32 and the camera body 11 in the embodiment of this application, the lens 12 and the camera hole 21 are directly accurately positioned by using the visual positioning system, and the accommodation groove 32 plays a role in only accommodating the camera body 11. Therefore, a requirement for size precision of the accommodation groove 32 and a requirement for size precision of the outer wall of the camera body 11 are low. A size of the accommodation groove 32 only needs to meet a centering adjustment allowance of the lens 12 and the camera hole 21. In addition, a requirement for installation precision of installing the middle frame 30 onto the touchscreen 20 is also low. Therefore, overall difficulties in processing and assembling the front camera are reduced.

Figure 6:
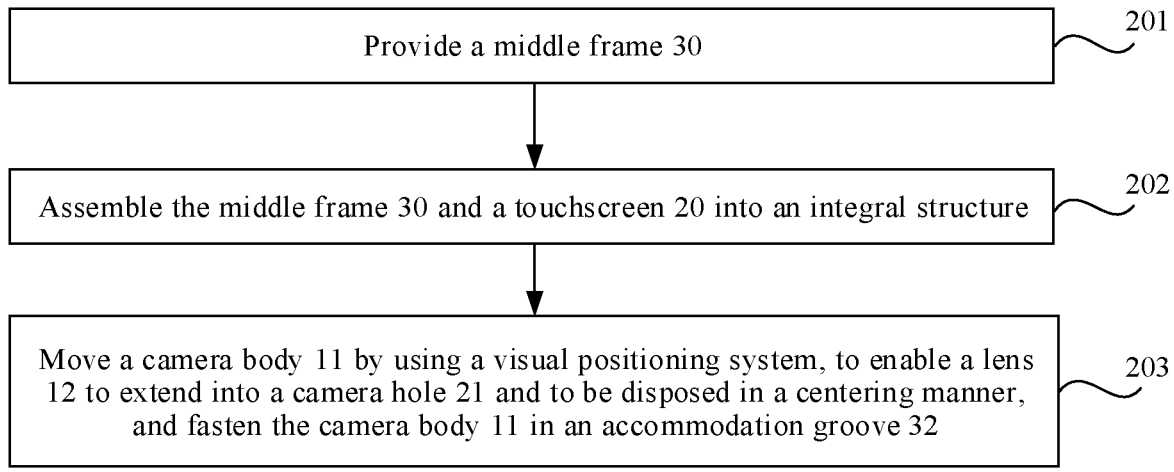
FIG. 6 is a flowchart of another example of the front camera assembling method according to an embodiment of this application.

FIG. 6 is a flowchart of another example of the front camera assembling method according to an embodiment of this application.

As shown in FIG. 6, in an embodiment provided in this application, the assembling method includes the following steps.

Step 201: Provide the middle frame 30.

Step 202: Assemble the middle frame 30 and the touchscreen 20 into an integral structure.

Step 203: Move the camera body 11 by using the visual positioning system, to enable the lens 12 to extend into the camera hole 21 and to be disposed in a centering manner, and bond and fasten the camera body 11 in an accommodation groove 32.

Optionally, the camera body 11 and the accommodation groove 32 may be bonded on a side wall or a bottom wall of the accommodation groove 32.

Optionally, when the camera body 11 is bonded to a groove wall of the accommodation groove 32, an adhesive 50 or a double-sided adhesive may be used.

Optionally, the camera body 11 is bonded to the accommodation groove 32 in two implementations. In a first implementation, the adhesive 50 or the double-sided adhesive is affixed to a bonding position of the camera body 11 and/or the accommodation groove 32 in advance, and then the camera body 11 is bonded to the groove wall of the accommodation groove 32 when the lens 12 and the camera hole 21 are disposed in a centering manner by using the visual positioning system. In a second implementation, after the lens 12 and the camera hole 21 are disposed in a centering manner by using the visual positioning system, a robotic arm of the visual positioning system is kept motionless, and the adhesive 50 is injected into a gap between the camera body 11 and the accommodation groove 32 by using a glue dispensing device.

In this embodiment, the camera body 11 may be quickly and firmly fastened in the accommodation groove 32 by bonding, which is implemented easily.

As described above, the camera body 11 is fastened in the accommodation groove 32 in a variety of manners, and the camera body 11 may be fastened in the accommodation groove 32 by using an additional component. That is, in an embodiment provided in this application, in step 103, before the visual positioning system is used, a camera support 40 is fastened to the camera body 11, and the camera support 40 is fastened to the middle frame 30, to achieve a purpose of fastening the camera body 11 in the accommodation groove 32. Specific steps are as follows.

Step 1031: Fasten the camera body 11 to the camera support 40.

Step 1032: Move the camera support 40 and the camera body 11 by using the visual positioning system, to enable the lens 12 to extend into the camera hole 21 through the hole channel 31 and to be disposed in a centering manner, and fasten the camera support 40 to the middle frame 30, to enable the camera body 11 to be fastened in the accommodation groove 32.

In this embodiment, the camera support 40 is fastened to the middle frame 30, to fasten the camera body 11 in the accommodation groove 32. In this fastening manner, implementation objects are the camera support 40 and the middle frame 30, and direct contact with the camera body 11 may be prevented, to prevent damage to the camera body 11 during assembly and reduce material damage in an assembling phase.

In addition, in a material loading phase, when the visual positioning system picks up the camera body 11, a sucked or clamped object is also the camera support 40. This also prevents direct contact with the camera body 11, and can effectively prevent damage to the camera body 11 during material transfer, and further reduce material damage.

Optionally, the camera support 40 is fastened to the camera body 11 in a variety of manners, such as bonding by using the adhesive 50, soldering, snap-fitting, or connection by using fasteners 44.

Optionally, the camera support 40 is fastened to the middle frame 30 in a variety of manners, such as bonding by using the adhesive 50, soldering, or connection by using the fasteners 44.

As described above, the camera body 11 and the camera support 40 may be bonded by using the adhesive 50. A specific implementation is shown in an embodiment provided in this application. The middle part of the camera support 40 is provided with a convexly formed accommodation housing 41. Based on the design, a step of fastening the camera body 11 to the camera support 40 specifically includes:

bonding and fastening the camera body 11 in the convexly formed accommodation housing 41 in the middle of the camera support 40. In this embodiment, by bonding and fastening the camera body 11 in the accommodation housing 41, the accommodation housing 41 may protect a part that is of the camera body 11 and that is exposed out of the accommodation groove 32, to prevent the camera body 11 from being damaged due to a hit by another component during assembly. In addition, the camera body 11 may be fastened to the camera support 40 more firmly by bonding the adhesive 50, which is implemented easily.

Figure 7:
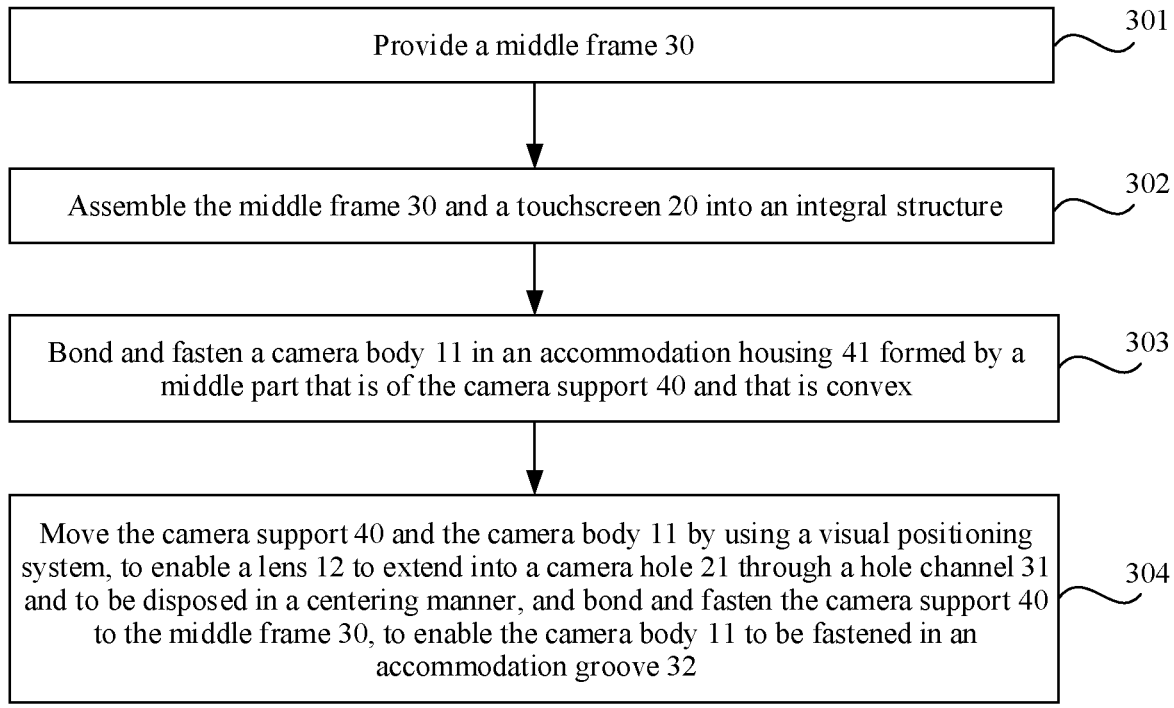
FIG. 7 is a flowchart of another example of the front camera assembling method according to an embodiment of this application.
Figure 8:
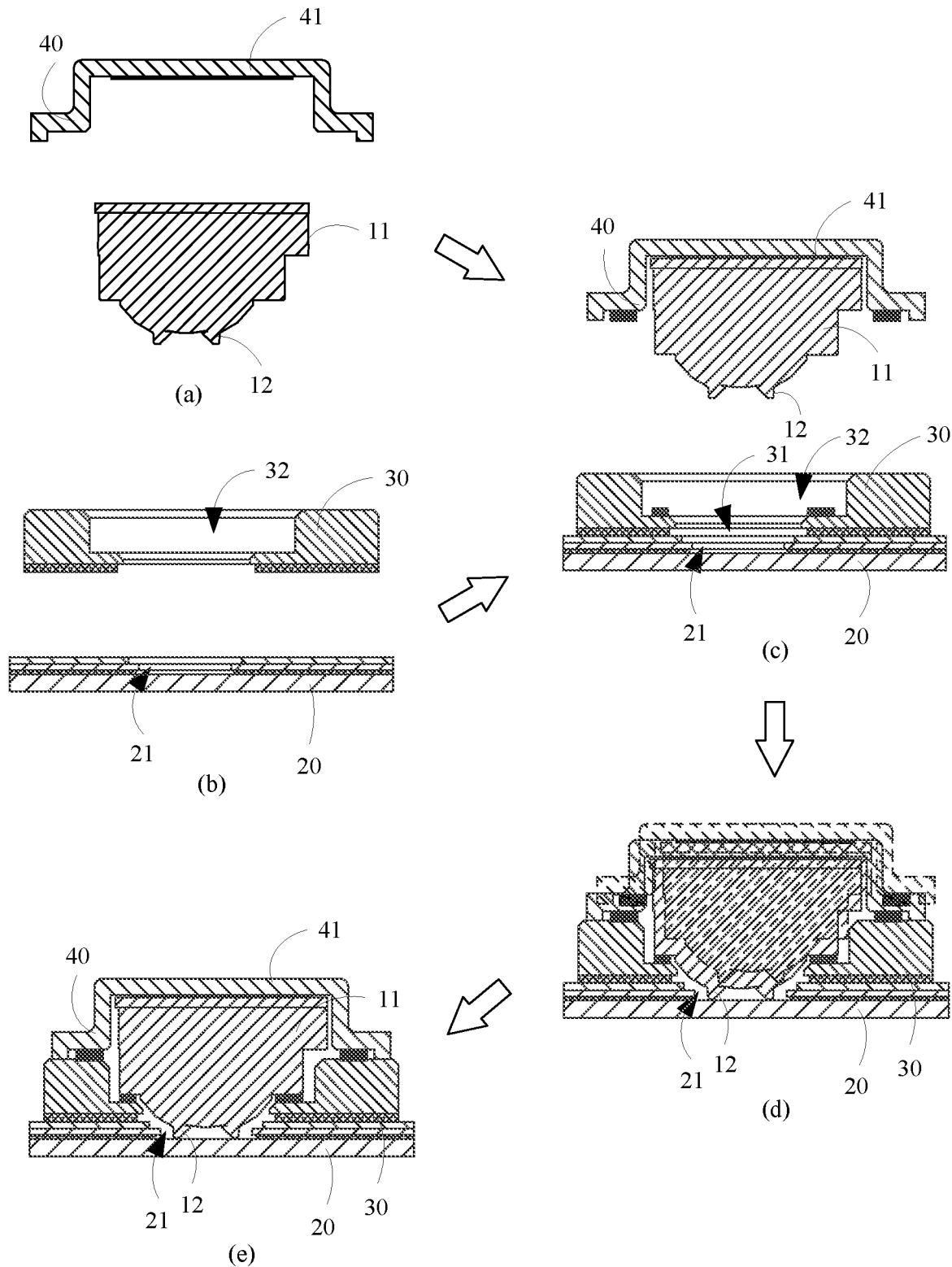
FIG. 8 is a schematic diagram of another example of the front camera assembling method according to an embodiment of this application.

FIG. 7 is a flowchart of another example of the front camera assembling method according to an embodiment of this application. FIG. 8 is a schematic diagram of another example of the front camera assembling method according to an embodiment of this application. (a) of FIG. 8 is a schematic diagram in which the camera body 11 is not connected to the camera support 40; (b) of FIG. 8 is a schematic diagram in which the middle frame 30 is not connected to the touchscreen 20; (c) of FIG. 8 is a schematic diagram of connection between the camera body 11 and the camera support 40 and connection between the middle frame 30 and the touchscreen 20; (d) of FIG. 8 is a schematic diagram in which the lens 12 and the camera hole 21 are disposed in a centering manner; and (e) of FIG. 8 is a schematic diagram of connection between the camera support 40 and the middle frame 30.

As described above, the camera support 40 may be bonded to the middle frame 30 by using an adhesive 50. A specific implementation is shown in an embodiment provided in this application. As shown in FIG. 7 and FIG. 8, the assembling method includes the following steps.

Step 301: As shown in (a) of FIG. 8, provide the middle frame 30.

Step 302: As shown in (b) and (c) of FIG. 8, assemble the middle frame 30 and the touchscreen 20 into an integral structure.

Step 303: As shown in (a) and (c) of FIG. 8, bond and fasten the camera body 11 in an accommodation housing 41 formed by a middle part that is of the camera support 40 and that is convex.

Step 304: As shown in (d) and (e) of FIG. 8, move the camera support 40 and the camera body 11 by using the visual positioning system, to enable the lens 12 to extend into the camera hole 21 through a hole channel 31 and to be disposed in a centering manner, and bond and fasten the camera support 40 to the middle frame 30, to enable the camera body 11 to be fastened in an accommodation groove 32.

In this embodiment, the camera body 11 and the middle frame 30 may be fastened more firmly by using an adhesive 50 without using another connection structure (for example, a fastener 44). This may improve integrity of a front camera assembling structure. In addition, size precision of another connection structure may not be considered when the adhesive 50 is used for bonding, reducing processing and assembling difficulties.

Optionally, the camera body 11 is bonded to the middle frame 30 in two implementations. In a first implementation, the adhesive 50 is coated to a bonding position of the camera body 11 and/or the middle frame 30 in advance, and then the camera body 11 is bonded to the middle frame 30 when the lens 12 and the camera hole 21 are disposed in a centering manner by using the visual positioning system. In a second implementation, after the lens 12 and the camera hole 21 are disposed in a centering manner by using the visual positioning system, a robotic arm of the visual positioning system is kept motionless, and the adhesive 50 is injected into a gap of a bonding position between the camera body 11 and the middle frame 30 by using a glue dispensing device.

Figure 9:
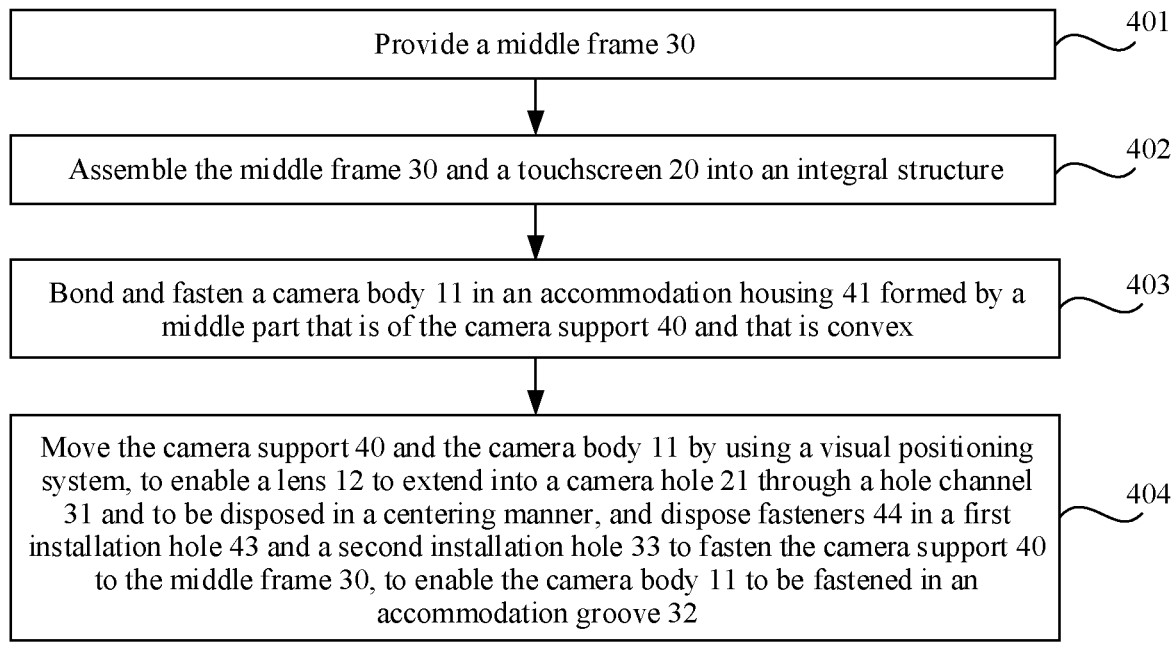
FIG. 9 is a flowchart of another example of the front camera assembling method according to an embodiment of this application.

FIG. 9 is a flowchart of another example of the front camera assembling method according to an embodiment of this application.

As described above, the camera support 40 and the middle frame 30 may be locked by using the fasteners 44. A specific implementation is shown in an embodiment provided in this application. Two ends of the camera support 40 are provided with first installation holes 43, and the middle frame 30 is provided with second installation holes 33 corresponding to the first installation holes 43. Based on the design, as shown in FIG. 9, the assembling method includes the following steps.

Step 401: Provide the middle frame 30.

Step 402: Assemble the middle frame 30 and the touchscreen 20 into an integral structure.

Step 403: Bond and fasten the camera body 11 in an accommodation housing 41 formed by a middle part that is of the camera support 40 and that is convex.

Step 404: Move the camera support 40 and the camera body 11 by using the visual positioning system, to enable the lens 12 to extend into the camera hole 21 through a hole channel 31 and to be disposed in a centering manner, and dispose the fasteners 44 in the first installation hole 43 and the second installation hole 33 to fasten the camera support 40 to the middle frame 30, to enable the camera body 11 to be fastened in an accommodation groove 32.

In this embodiment, the camera support 40 and the middle frame 30 are locked by using the fasteners 44, helping to enable the front camera to be disassembled and repaired, and reassembled and reused.

Figure 10:
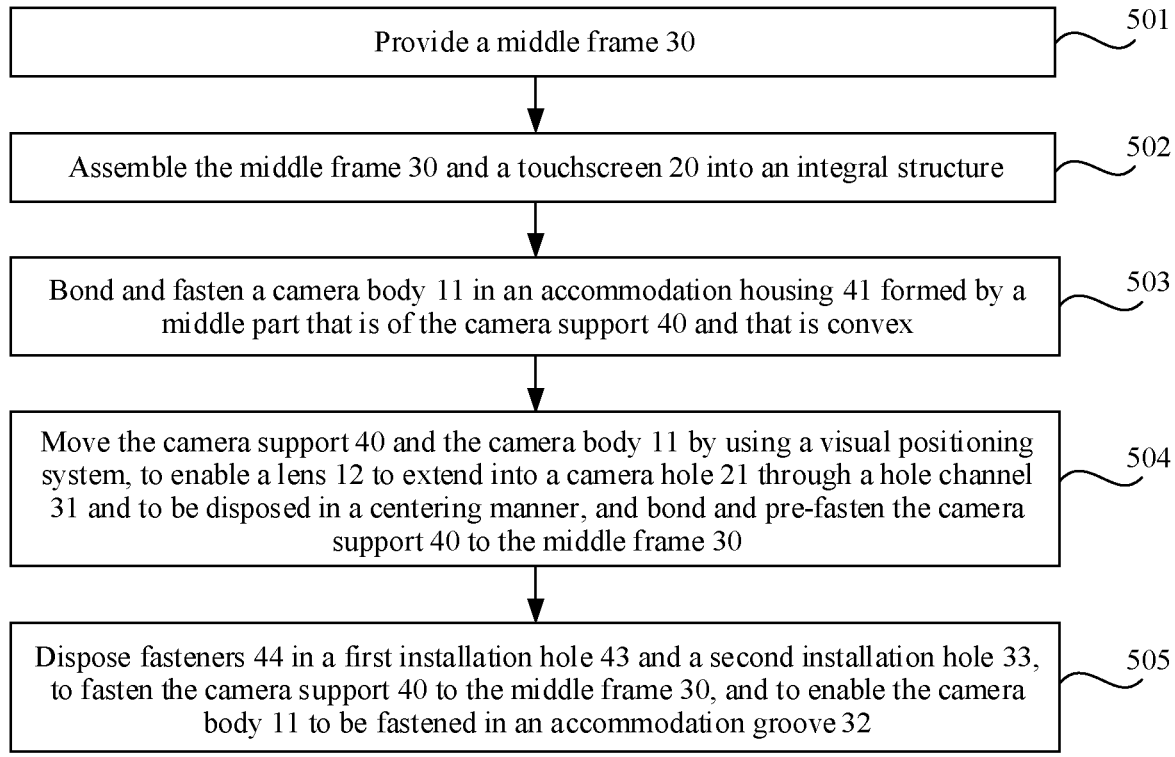
FIG. 10 is a flowchart of another example of the front camera assembling method according to an embodiment of this application.
Figure 11:
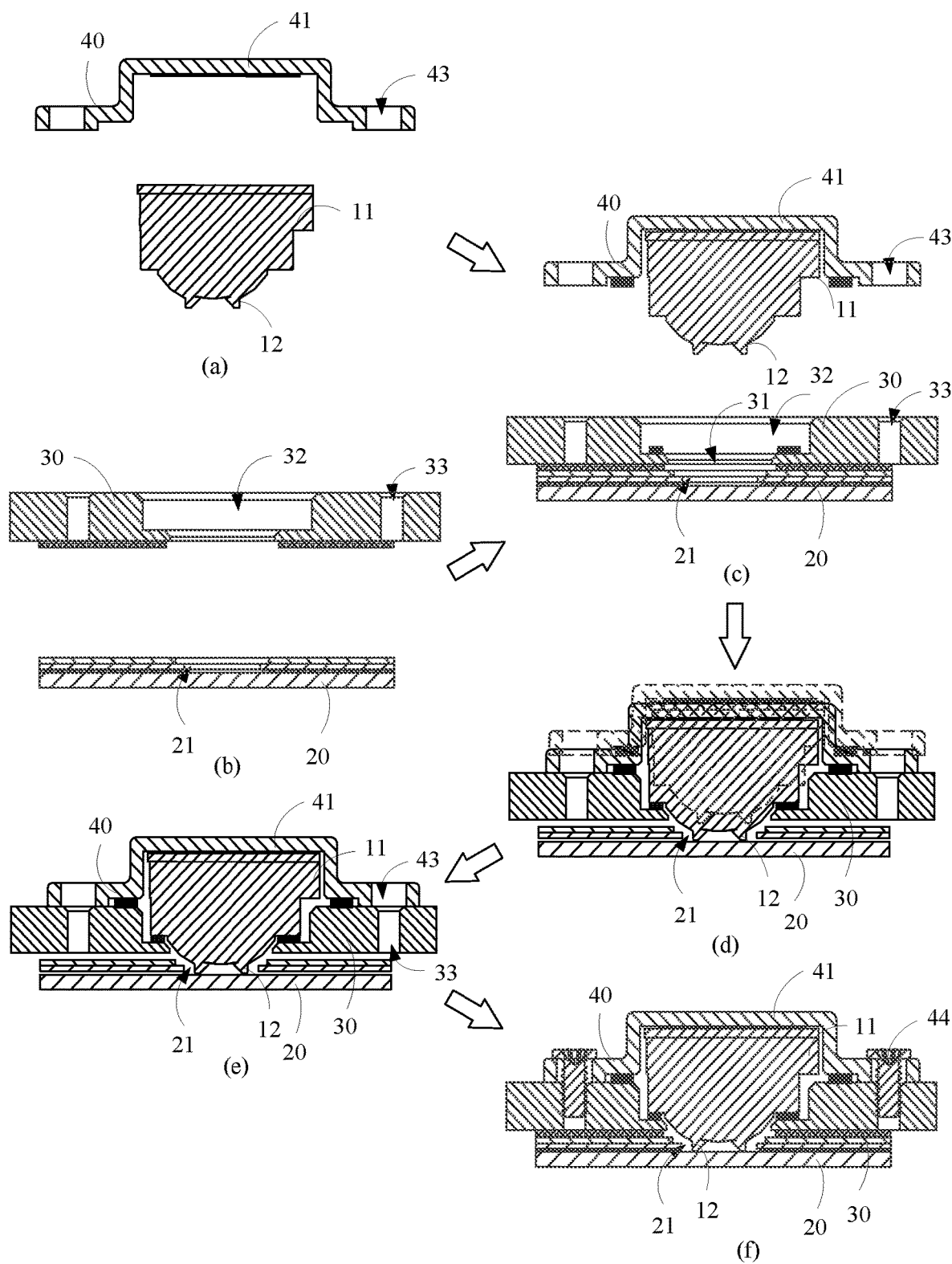
FIG. 11 is a schematic diagram of another example of the front camera assembling method according to an embodiment of this application.

FIG. 10 is a flowchart of another example of the front camera assembling method according to an embodiment of this application. FIG. 11 is a schematic diagram of another example of the front camera assembling method according to an embodiment of this application. (a) of FIG. 11 is a schematic diagram in which the camera body 11 is not connected to the camera support 40; (b) of FIG. 11 is a schematic diagram in which the middle frame 30 is not connected to the touchscreen 20; (c) of FIG. 11 is a schematic diagram of connection between the camera body 11 and the camera support 40 and connection between the middle frame 30 and the touchscreen 20; (d) of FIG. 11 is a schematic diagram in which the lens 12 and the camera hole 21 are disposed in a centering manner; (e) of FIG. 11 is a schematic diagram of bonding and pre-fastening of the camera support 40 and the middle frame 30; and (f) of FIG. 11 is a schematic diagram of locking of the camera support 40 and the middle frame 30 by using fasteners 44.

In the foregoing embodiments, two manners in which the camera support 40 is bonded to the middle frame 30 by using the adhesive 50 or the fasteners 44, to increase connection strength between the camera support 40 and the middle frame 30, and bonding by using the adhesive 50 and connection by using the fasteners 44 may be implemented simultaneously. Specifically, as shown in FIG. 10 and FIG. 11, in an embodiment provided in this application, the assembling method includes the following steps.

Step 501: As shown in (a) of FIG. 11, provide the middle frame 30.

Step 502: As shown in (b) and (c) of FIG. 11, assemble the middle frame 30 and the touchscreen 20 into an integral structure.

Step 503: As shown in (a) and (c) of FIG. 11, bond and fasten the camera body 11 in an accommodation housing 41 formed by a middle part that is of the camera support 40 and that is convex.

Step 504: As shown in (d) and (e) of FIG. 11, move the camera support 40 and the camera body 11 by using the visual positioning system, to enable the lens 12 to extend into the camera hole 21 through a hole channel 31 and to be disposed in a centering manner, and bond and pre-fasten the camera support 40 and the middle frame 30.

Step 505: As shown in (f) of FIG. 11, dispose the fasteners 44 in a first installation hole 43 and a second installation hole 33, to fasten the camera support 40 to the middle frame 30, and to enable the camera body 11 to be fastened in an accommodation groove 32.

In this embodiment, after the camera support 40 and the middle frame 30 are bonded and pre-fastened, the camera support 40 and the middle frame 30 may be moved out of a position of the visual positioning system as a whole, and then locking by using the fasteners 44 may be performed at another position. This can improve efficiency of disposing in a centering manner by using the visual positioning system, and prevent the camera support 40 and the middle frame 30 from occupying the visual positioning system for a long time, reducing assembly efficiency. In addition, in this embodiment, the camera support 40 and the middle frame 30 are bonded both by using an adhesive 50 and connected by using the fasteners 44. This can ensure adequate connection strength between the camera support 40 and the middle frame 30. To sum up, this embodiment has advantages of high assembly efficiency and a good anti-seismic effect.

As shown in (d) and (e) of FIG. 11, in an embodiment provided in this application, an aperture of the first installation hole 43 is larger than an aperture of the second installation hole 33, to enable the camera support 40 to have an adjustment allowance relative to the middle frame 30.

In this embodiment, because the aperture of the first installation hole 43 is larger than the aperture of the second installation hole 33, the first installation hole 43 can deviate relative to the second installation hole 33 within a specific range. When the lens 12 and the camera hole 21 are adjusted in a centering manner, a displacement of the camera support 40 relative to the middle frame 30 in a horizontal direction also has an adjustment allowance.

Optionally, the fastener 44 may be a screw or pin.

Specifically, when the fastener 44 is a screw, a hole wall of the second installation hole 33 is provided with a thread fitting the screw. When the screw is screwed in the second installation hole 33, a head of the screw is pressed at an orifice of the first installation hole 43.

Specifically, when the fastener 44 is a pin, the second installation hole 33 and the pin are in interference fit. When the pin is inserted into the second installation hole 33, a head of the pin is pressed at the orifice of the first installation hole 43.

The camera support 40 may be alternatively designed in another manner. For example, in another embodiment provided in this application, the camera support 40 is provided with a concave receiving groove 45, and an avoidance hole 46 for avoiding the lens 12 is disposed at a bottom groove wall of the receiving groove 45. Based on the design, a step of fastening the camera body 11 to the camera support 40 specifically include:

enabling the lens 12 to pass through the avoidance hole 46, and then bonding and fastening the camera body 11 in the receiving groove 45.

In addition, based on the foregoing design in which the camera support 40 is provided with the concave receiving groove 45, in an embodiment provided in this application, the step of fastening the camera support 40 to the middle frame 30 specifically includes:

bonding and fastening an outer side of a groove wall of the receiving groove 45 in the accommodation groove 32.

Optionally, a size of the outer side of the groove wall of the receiving groove 45 is less than a size of the accommodation groove 32. This enables the receiving groove 45 to be displaced in a horizontal direction in the accommodation groove 32, enabling the camera support 40 to have an adjustment allowance in the horizontal direction relative to the middle frame 30 when the lens 12 and the camera hole 21 are adjusted in a centering manner.

Based on the foregoing design in which the camera support 40 is provided with the concave receiving groove 45, in an embodiment provided in this application, two ends of the camera support 40 are provided with the first installation holes 43, and the middle frame 30 is provided with the second installation holes 33 corresponding to the first installation holes 43. The step of fastening the camera support 40 to the middle frame 30 specifically includes:

disposing the fasteners 44 in the first installation hole 43 and the second installation hole 33 to fasten the camera support 40 to the middle frame 30.

Optionally, the aperture of the first installation hole 43 is larger than the aperture of the second installation hole 33, to enable the camera support 40 to have an adjustment allowance relative to the middle frame 30.

Figure 12:
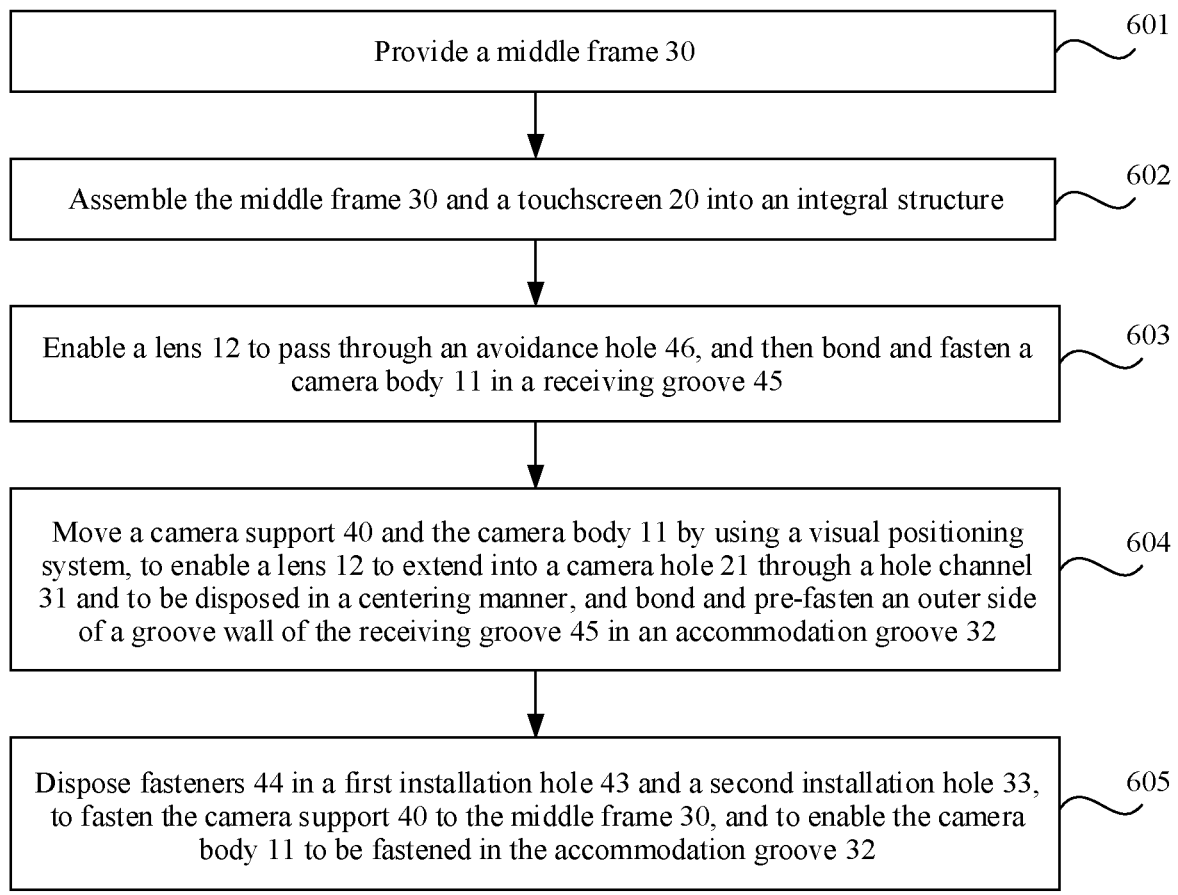
FIG. 12 is a flowchart of another example of the front camera assembling method according to an embodiment of this application.
Figure 13:
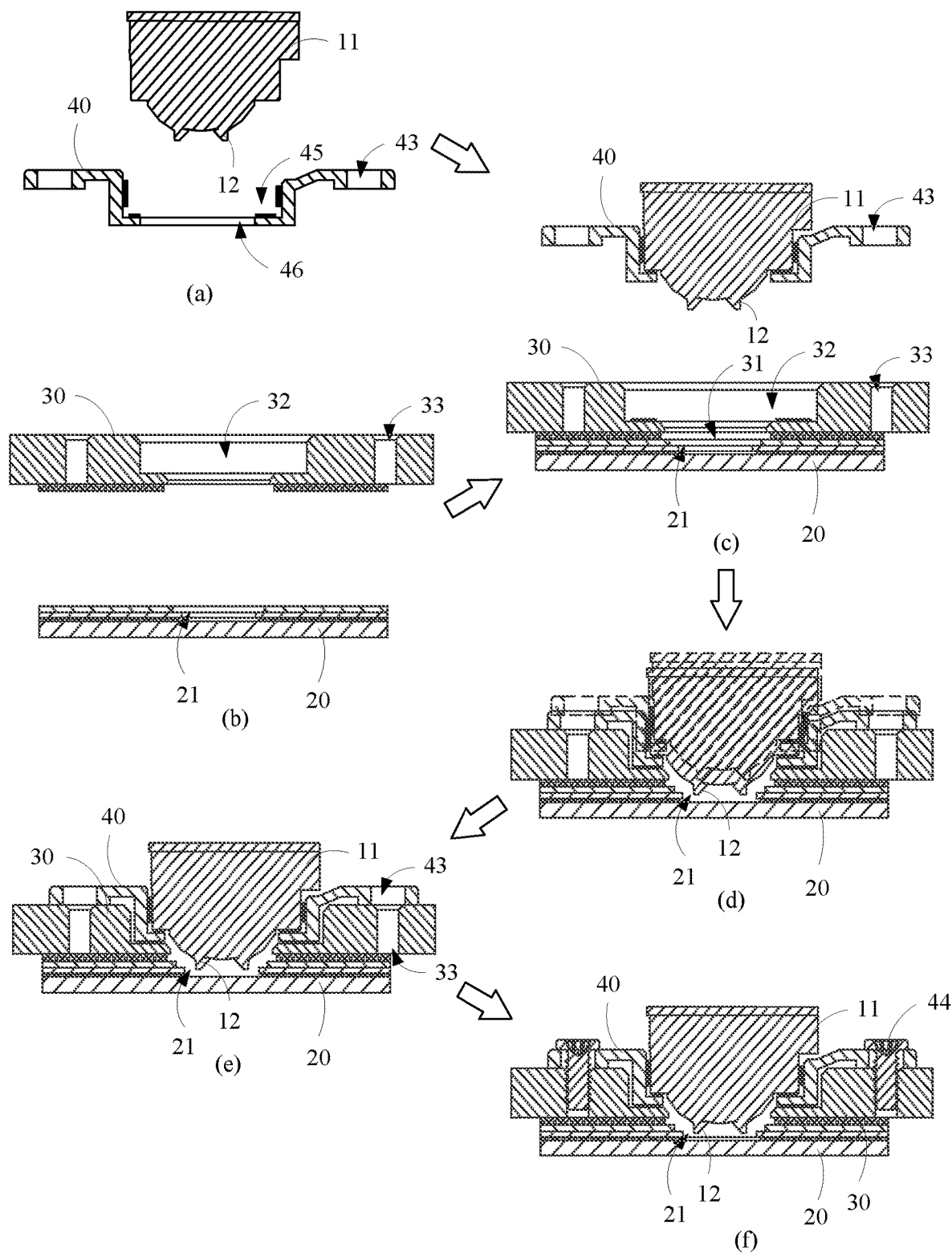
FIG. 13 is a schematic diagram of another example of the front camera assembling method according to an embodiment of this application.

FIG. 12 is a flowchart of another example of the front camera assembling method according to an embodiment of this application. FIG. 13 is a schematic diagram of another example of the front camera assembling method according to an embodiment of this application. (a) of FIG. 13 is a schematic diagram in which the camera body 11 is not connected to the camera support 40; (b) of FIG. 13 is a schematic diagram in which the middle frame 30 is not connected to the touchscreen 20; (c) of FIG. 13 is a schematic diagram of connection between the camera body 11 and the camera support 40 and connection between the middle frame 30 and the touchscreen 20; (d) of FIG. 13 is a schematic diagram in which the lens 12 and the camera hole 21 are disposed in a centering manner; (e) of FIG. 13 is a schematic diagram of bonding and pre-fastening of the camera support 40 and the middle frame 30; and (f) of FIG. 13 is a schematic diagram of locking of the camera support 40 and the middle frame 30 by using fasteners 44.

As shown in FIG. 12 and FIG. 13, in an embodiment provided in this application, the assembling method includes the following steps.

Step 601: As shown in (a) of FIG. 13, provide the middle frame 30.

Step 602: As shown in (b) and (c) of FIG. 13, assemble the middle frame 30 and the touchscreen 20 into an integral structure.

Step 603: As shown in (a) and (c) of FIG. 13, enable the lens 12 to pass through an avoidance hole 46, and then bond and fasten the camera body 11 in a receiving groove 45.

Step 604: As shown in (d) and (e) of FIG. 13, move the camera support 40 and the camera body 11 by using the visual positioning system, to enable the lens 12 to extend into the camera hole 21 through a hole channel 31 and to be disposed in a centering manner, and bond and pre-fasten an outer side of a groove wall of the receiving groove 45 in an accommodation groove 32.

Step 605: As shown in (f) of FIG. 13, dispose the fasteners 44 in a first installation hole 43 and a second installation hole 33, to fasten the camera support 40 to the middle frame 30, and to enable the camera body 11 to be fastened in the accommodation groove 32.

In this embodiment, after the camera support 40 and the middle frame 30 are bonded and pre-fastened, the camera support 40 and the middle frame 30 may be moved out of a position of the visual positioning system as a whole, and then locking by using the fasteners 44 may be performed at another position. This can improve efficiency of disposing in a centering manner by using the visual positioning system, and prevent the camera support 40 and the middle frame 30 from occupying the visual positioning system for a long time, reducing assembly efficiency. In addition, in this embodiment, the camera support 40 and the middle frame 30 are bonded both by using an adhesive 50 and connected by using the fasteners 44. This can ensure adequate connection strength between the camera support 40 and the middle frame 30. In addition, because the camera support 40 is fastened to the middle frame 30 in an embedding manner, connection strength between the camera support 40 and the middle frame 30 is further increased. To sum up, this embodiment also has advantages of high assembly efficiency and a good anti-seismic effect.

Figure 14:
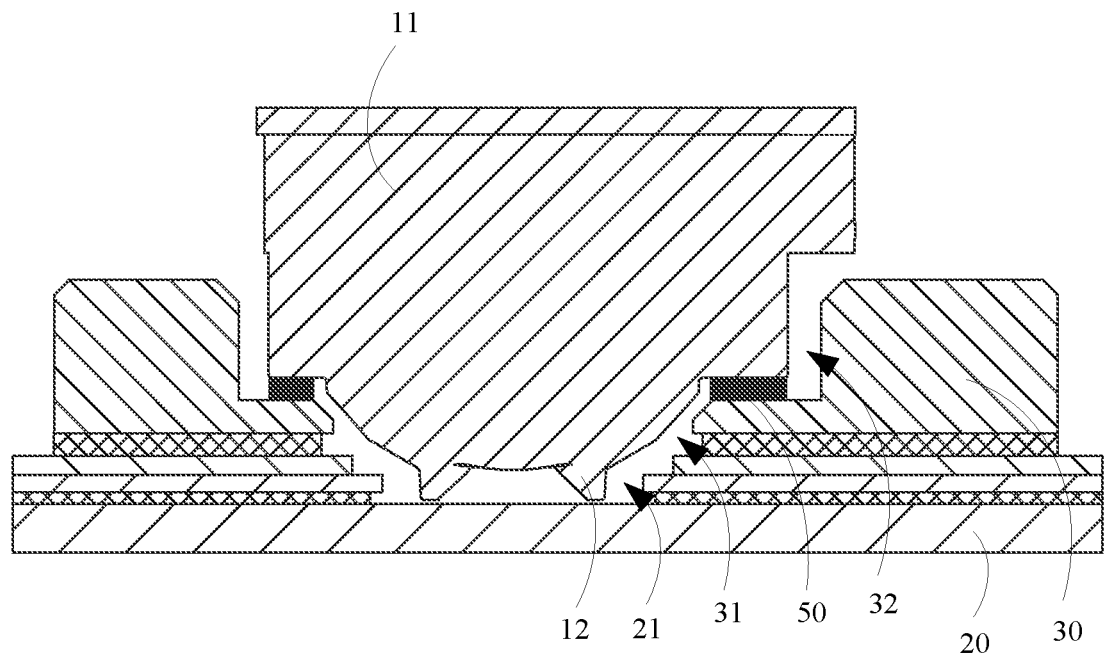
FIG. 14 is a sectional view of an example of a front camera assembling structure according to an embodiment of this application.

FIG. 14 is a sectional view of an example of a front camera assembling structure according to an embodiment of this application.

As shown in FIG. 14, an embodiment of this application further provides a front camera assembling structure, including a camera body 11, a touchscreen 20, and a middle frame 30.

The camera body 11 includes a lens 12 located at a front end.

The touchscreen 20 is provided with a camera hole 21 for accommodating the lens 12.

The middle frame 30 is fastened to the touchscreen 20. The middle frame 30 is provided with an accommodation groove 32 whose size meets a requirement for adjusting the lens 12 and the camera hole 21 in a centering manner. The accommodation groove 32 communicates with the camera hole 21 through a hole channel 31, the camera body 11 is fastened in the accommodation groove 32, and the lens 12 passes through the hole channel 31 and is disposed in the camera hole 21 in a centering manner.

In the front camera assembling structure provided in this application, when the middle frame 30 is provided with the accommodation groove 32 whose size meets a requirement for adjusting the lens 12 and the camera hole 21 in a centering manner, the lens 12 and the camera hole 21 may be accurately positioned by using the visual positioning system, and then the camera body 11 is fastened in the accommodation groove 32, to reduce parts associated and assembled between the lens 12 and the camera hole 21 significantly, shorten a size chain significantly, and achieve a minimum cumulative tolerance, and an aperture of the camera hole 21 may be further designed to be small. Therefore, a gap size between the camera hole 21 and the lens 12 is reduced, an impact of a lens black edge 70 on user's vision is reduced, and the screen-to-body ratio of the electronic device is increased.

In addition, because the lens 12 and the camera hole 21 are accurately positioned by using the visual positioning system, the accommodation groove 32 in this embodiment of this application plays a role in only accommodating the camera body 11, and does not play a role in positioning the lens 12 in the camera hole 21. Therefore, in this application, a requirement for size precision of the accommodation groove 32 is relatively low, and the size of the accommodation groove 32 only needs to meet a centering adjustment allowance of the lens 12 and the camera hole 21. In addition, requirements for size precision of an outer wall of the camera body 11 and installation precision of installing the middle frame 30 onto the touchscreen 20 are also relatively low. Therefore, difficulties in processing and assembling the front camera are generally reduced.

Optionally, the middle frame 30 is fastened to the camera body 11 in a variety of manners. The middle frame 30 may be directly bonded to the camera body 11, or the middle frame 30 is indirectly connected to the camera body 11 by using an additional component, such as a camera support 40 in a following embodiment. The camera body 11 is pre-connected to the camera support 40, and then the middle frame 30 is bonded to the camera support 40 or connected by using fasteners 44. Refer to the following description for details.

As described above, the middle frame 30 and the camera body 11 may be directly bonded. That is, in this embodiment, the camera body 11 is bonded and fastened to the accommodation groove 32 by using an adhesive 50. It should be especially noted that the accommodation groove 32 in this embodiment is different from a limiting groove 34 in the related technology. The accommodation groove 32 in this embodiment plays a role in only accommodating the camera body 11, and is further configured to increase an overlapping area of the middle frame 30 and the camera body 11, to enable the camera body 11 in the accommodation groove 32 to be in contact with the groove wall with an adequate contact area on which more adhesive 50 may be coated for bonding and fastening, ensuring fastening strength between the camera body 11 and the middle frame 30. A size requirement for the accommodation groove 32 is not strict, and only a shape of the accommodation groove 32 needs to generally meet an appearance requirement for the camera body 11, enabling the camera body 11 to be smoothly disposed in the accommodation groove 32. Therefore, compared with the limiting groove 34 with a strict size requirement for processing in the related technology, a size requirement for the accommodation groove 32 in this embodiment is relatively low, and a processing difficulty is relatively low.

In this embodiment, the camera body 11 and the middle frame 30 may be fastened more firmly by using the adhesive 50 without using another connection structure. This may improve integrity of the electronic device. In addition, size precision of another connection structure may not be considered when the adhesive 50 is used for bonding, reducing processing and assembling difficulties.

Optionally, the adhesive 50 may be disposed in a groove bottom wall of the accommodation groove 32 in a pre-coating manner. Alternatively, after the camera body 11 is disposed in the accommodation groove 32, the adhesive 50 may be injected into a gap between the camera body 11 and the groove wall of the accommodation groove 32 in a glue dispensing manner.

Figure 15:
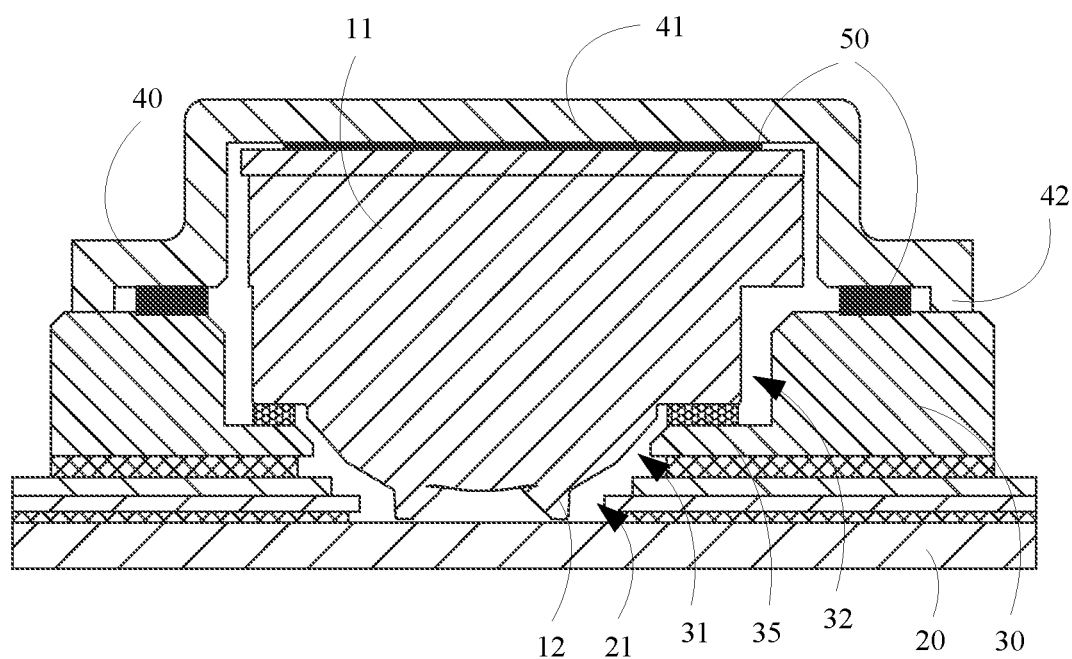
FIG. 15 is a sectional view of another example of the front camera assembling structure according to an embodiment of this application.

FIG. 15 is a sectional view of another example of the front camera assembling structure according to an embodiment of this application.

As shown in FIG. 15, in an embodiment provided in this application, the assembling structure further includes:

a camera support 40, separately fastened to the camera body 11 and the middle frame 30, to enable the camera body 11 to be fastened to the middle frame 30 by using the camera support 40.

As described above, the middle frame 30 and the camera body 11 may be indirectly connected by using an additional component. That is, in this embodiment, the camera support 40 is added between the camera body 11 and the middle frame 30. The camera support 40 is first connected to the camera body 11, and then the camera support 40 is connected to the middle frame 30.

Optionally, the camera support 40 is fastened to the camera body 11 in a variety of manners, such as bonding by using the adhesive 50, soldering, snap-fitting, or connection by using fasteners 44.

Specifically, the camera support 40 is bonded to the camera body 11 by using the adhesive 50. This manner has advantages of fast assembly and a small structure.

Optionally, the camera support 40 is fastened to the middle frame 30 in a variety of manners, such as bonding by using the adhesive 50 or connection by using the fasteners 44. Refer to the following embodiment for details.

Optionally, the camera body 11 is fastened to the middle frame 30 by using the camera support 40 in two manners. In a first manner, after the camera body 11 is connected to the middle frame 30, the connection is further reinforced by using the camera support 40. In a second manner, the camera body 11 is not connected to the middle frame 30, and the camera body 11 relies only on a connection relationship between the camera support 40 and the middle frame 30.

Optionally, the camera support 40 may be a flat plate structure, a housing structure, or a frame structure.

As shown in FIG. 15, in an embodiment provided in this application, the camera support 40 is provided with a convex accommodation housing 41, and the camera body 11 is fastened in the accommodation housing 41.

As described above, the camera support 40 may be a housing structure, that is, in this embodiment, the camera support 40 is provided with the convex accommodation housing 41, and the accommodation housing 41 surrounds an outside of the camera body 11. This enables the camera support 40 to better protect the camera body 11, preventing the camera body 11 from being damaged due to hit by another component during assembly.

In an embodiment provided in this application, edges of two ends of the camera support 40 include inwardly flanged edges 42, and an adhesive 50 is disposed on inner sides of the inwardly flanged edges 42 to bond and fasten the camera support 40 to the middle frame 30.

The inwardly flanged edges 42 in this embodiment mainly have two functions. A first function is limiting an installation depth of the lens 12. A height of the inwardly flanged edge 42 can determine a depth at which the lens 12 extends into the camera hole 21, to increase precision of assembling the front camera. A second function is preventing the adhesive 50 from spilling. The inwardly flanged edges 42 leave space by supporting between the camera support 40 and the middle frame 30. The space can accommodate the adhesive 50, to prevent the adhesive 50 from being squeezed and spilling out of a gap between the camera support 40 and the middle frame 30 when the camera support 40 and the middle frame 30 are pressed.

Based on the second function of the inwardly flanged edges 42, to further prevent the adhesive 50 from spilling, in an embodiment provided in this application, the inwardly flanged edges 42 are disposed to be half-circled on the edges of the ends of the camera support 40, to totally surround the adhesive 50.

Figure 16:
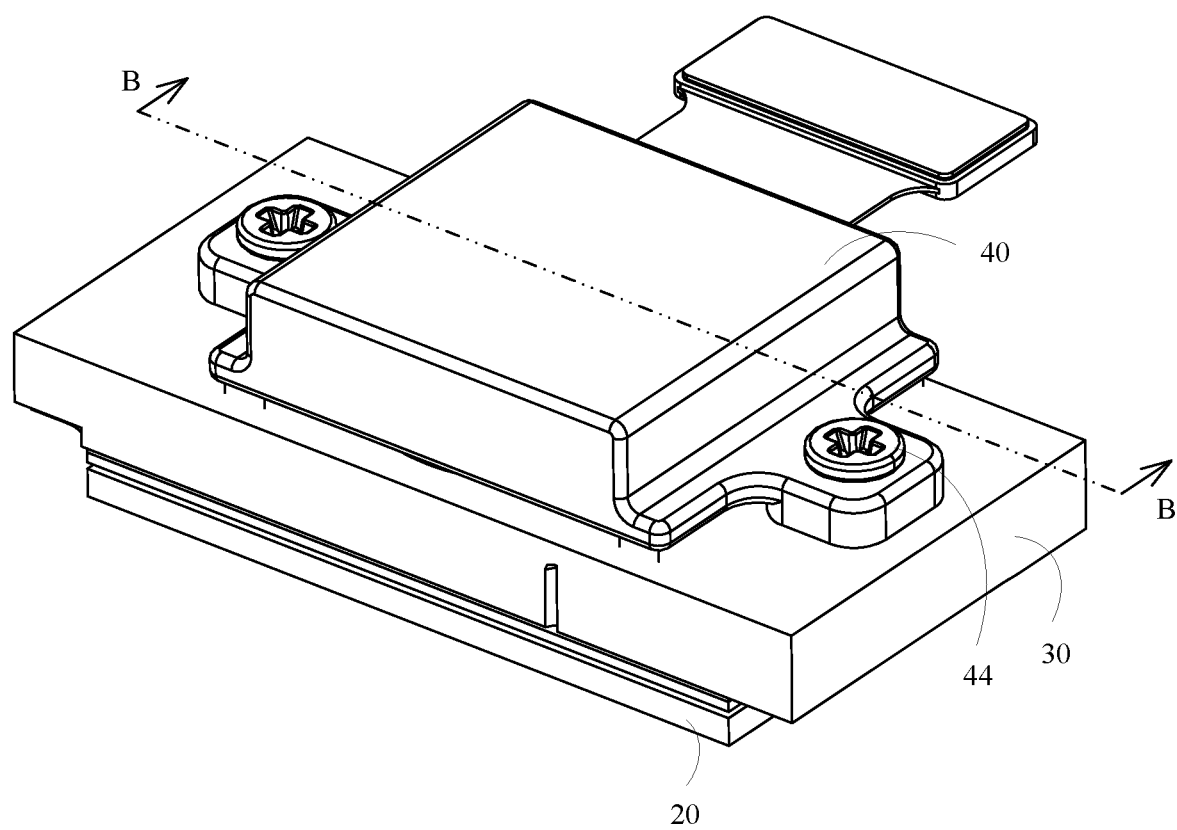
FIG. 16 is a schematic diagram of an example of a front camera assembling structure according to an embodiment of this application.
Figure 17:
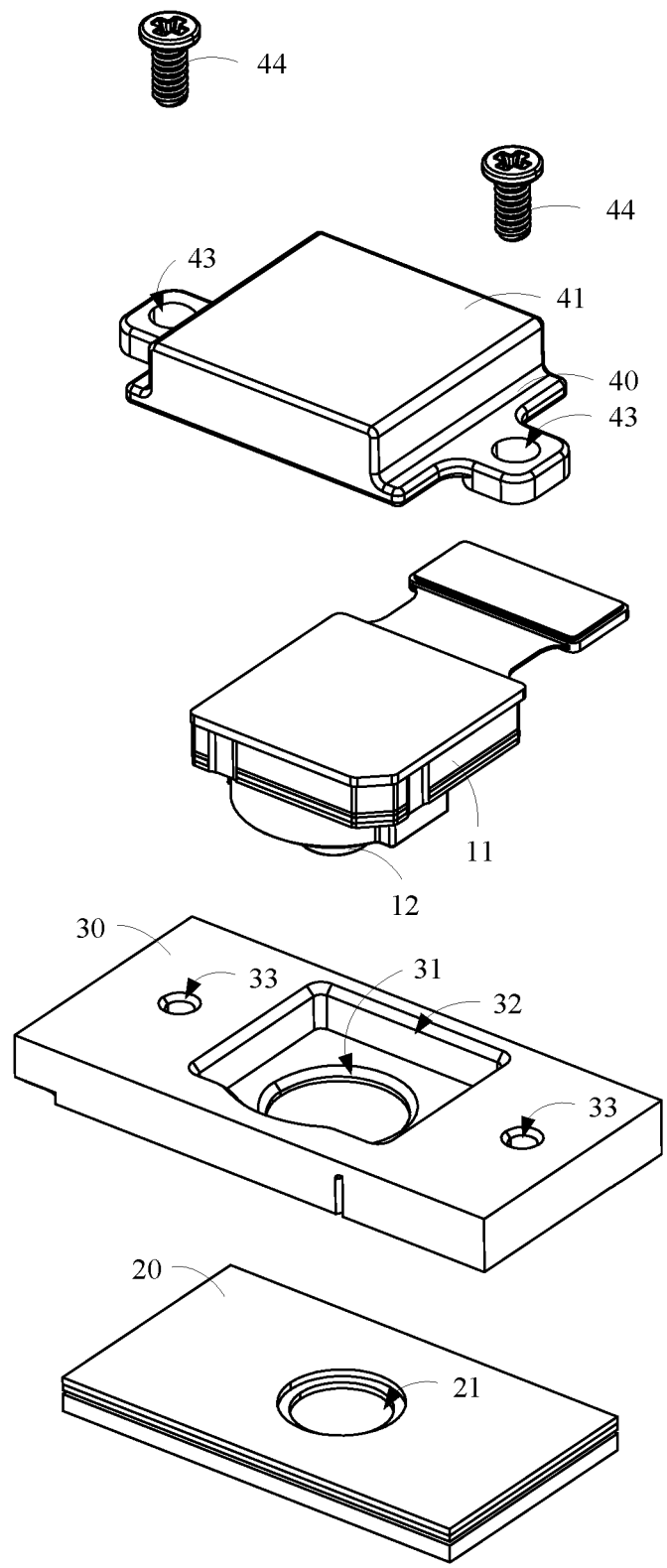
FIG. 17 is an exploded view of the front camera assembling structure in FIG. 16.
Figure 18:
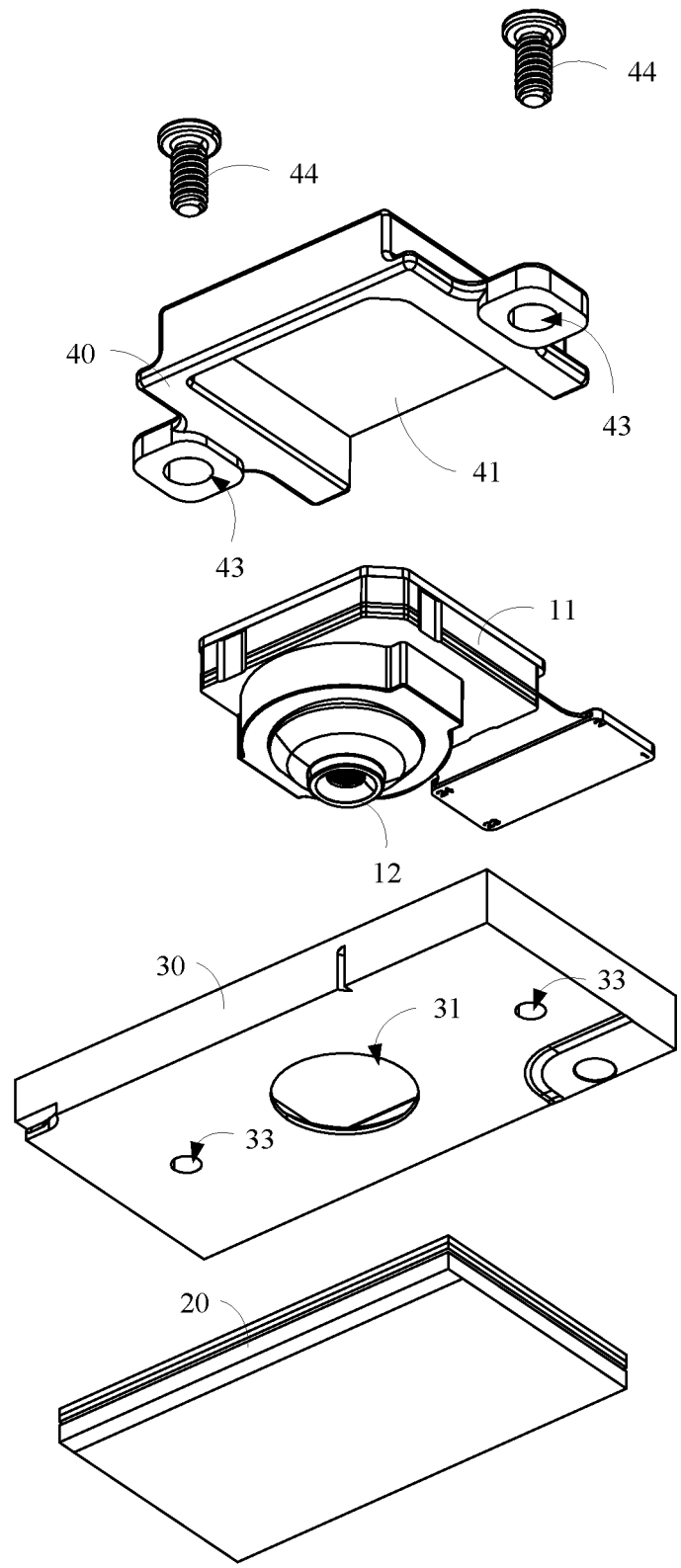
FIG. 18 is an exploded view of the front camera assembling structure in FIG. 16 from another viewing angle.
Figure 19:
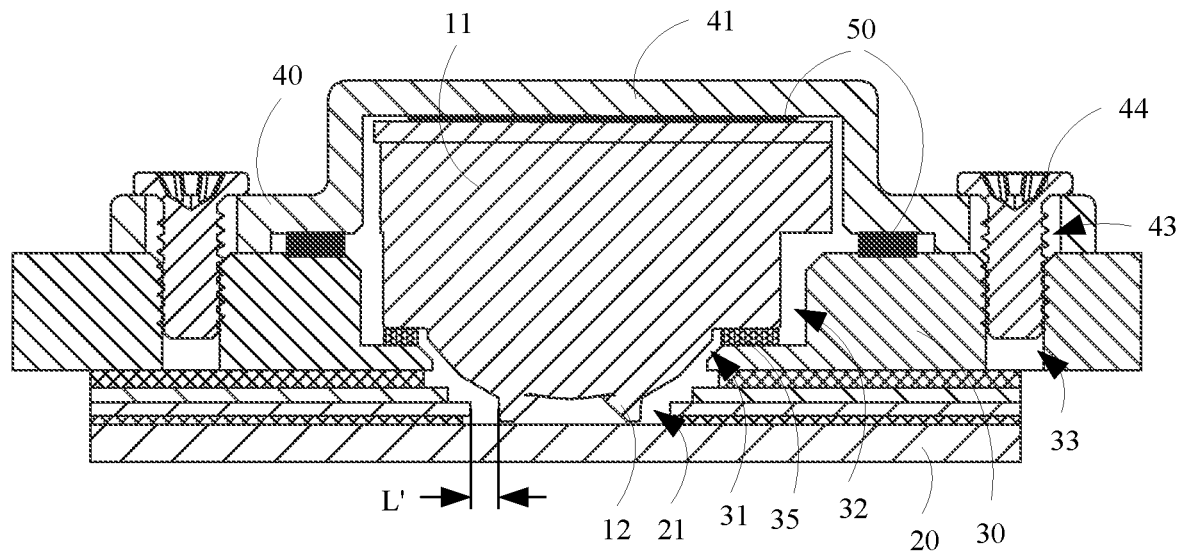
FIG. 19 is a sectional view in a B-B direction in FIG. 16.

FIG. 16 is a schematic diagram of an example of a front camera assembling structure according to an embodiment of this application. FIG. 17 is an exploded view of the front camera assembling structure in FIG. 16. FIG. 18 is an exploded view of the front camera assembling structure in FIG. 16 from another viewing angle. FIG. 19 is a sectional view in a B-B direction in FIG. 16.

As shown in FIG. 16 to FIG. 18, in an embodiment provided in this application, that a camera support 40 is connected to a middle frame 30 by using only fasteners 44 is specifically as follows: Two ends of the camera support 40 are provided with first installation holes 43, the middle frame 30 is provided with second installation holes 33 corresponding to the first installation holes 43, and the fasteners 44 are disposed in the first installation hole 43 and the second installation hole 33 to fasten the camera support 40 to the middle frame 30.

As shown in FIG. 19, in another embodiment provided in this application, bonding is reinforced by using the fasteners 44 after the camera support 40 is bonded to the middle frame 30. Specifically, after the camera support 40 is bonded and pre-fastened to the middle frame 30 by using the adhesive 50, the fasteners 44 are disposed in the first installation hole 43 and the second installation hole 33 to fasten the camera support 40 to the middle frame 30.

Optionally, the fastener 44 may be a screw or pin.

Specifically, when the fastener 44 is a screw, a hole wall of the second installation hole 33 is provided with a thread fitting the screw. When the screw is screwed in the second installation hole 33, a head of the screw is pressed at an orifice of the first installation hole 43.

Specifically, when the fastener 44 is a pin, the second installation hole 33 and the pin are in interference fit. When the pin is inserted into the second installation hole 33, a head of the pin is pressed at the orifice of the first installation hole 43.

In an embodiment provided in this application, an aperture of the first installation hole 43 is larger than an aperture of the second installation hole 33, to enable the camera support 40 to have an adjustment allowance relative to the middle frame 30.

In this embodiment, because the aperture of the first installation hole 43 is larger than the aperture of the second installation hole 33, the first installation hole 43 can deviate relative to the second installation hole 33 within a specific range. Therefore, when the lens 12 and the camera hole 21 are adjusted in a centering manner, the camera support 40 has an adjustment allowance relative to the middle frame 30 in a horizontal direction.

As shown in FIG. 15 and FIG. 19, in an embodiment provided in this application, an elastic buffer 35 is disposed between the camera body 11 and the middle frame 30.

The elastic buffer 35 is disposed between the camera body 11 and the middle frame 30, to buffer vibration and prevent the lens 12 from being hit. In addition, the elastic buffer 35 further has sealing and dust-proof functions, to prevent affecting lighting quality because dust and the like enter the camera.

Optionally, the elastic buffer 35 may be a buffer foam, or may be made of another soft and elastic material. In another embodiment, the elastic buffer 35 may not be disposed.

In an embodiment provided in this application, an accommodation housing 41 is a metal housing.

The accommodation housing 41 is configured to protect the camera body 11. In addition, in this embodiment, when the accommodation housing 41 is the metal housing, the accommodation housing 41 further has a heat conduction function and a shielding function.

In addition, when the accommodation housing 41 is the metal housing, pick-up and transfer may be performed by using a magnetic suction-type robotic arm, facilitating an operation in assembling.

Optionally, a material of the metal housing is stainless steel, nickel silver, magnesium aluminum alloy, or the like.

In this embodiment, the metal housing has specific strength, to effectively prevent an electronic component on the camera body 11 from being damaged, to protect the electronic component.

In an embodiment provided in this application, a heat conductive agent is filled in a gap between the accommodation housing 41 and the camera body 11.

A camera generates heat during operation, causing an internal temperature of the device to rise rapidly. To quickly transfer the heat, the heat conductive agent may be filled in the gap between the accommodation housing 41 and the camera body 11, and the heat is transferred to the accommodation housing 41 in a heat conduction manner. Then heat reaching the accommodation housing 41 is emitted to the environment through the middle frame 30 or a rear cover. The heat conductive agent may effectively fill the gap between the accommodation housing 41 and the camera body 11, reduce heat resistance, improve a capability of heat conduction from the camera body 11 to the accommodation housing 41, and make heat conduction more smooth and fast.

Optionally, the heat conductive agent may be a liquid metal. Specifically, a metal material may be a gallium-based alloy, an indium-based alloy, or a bismuth-based alloy.

In the foregoing embodiment, the camera support 40 having the convex accommodation housing 41 is described in detail. In another embodiment, a structure of the camera support 40 is designed in another manner. Details are as follows.

Figure 20:
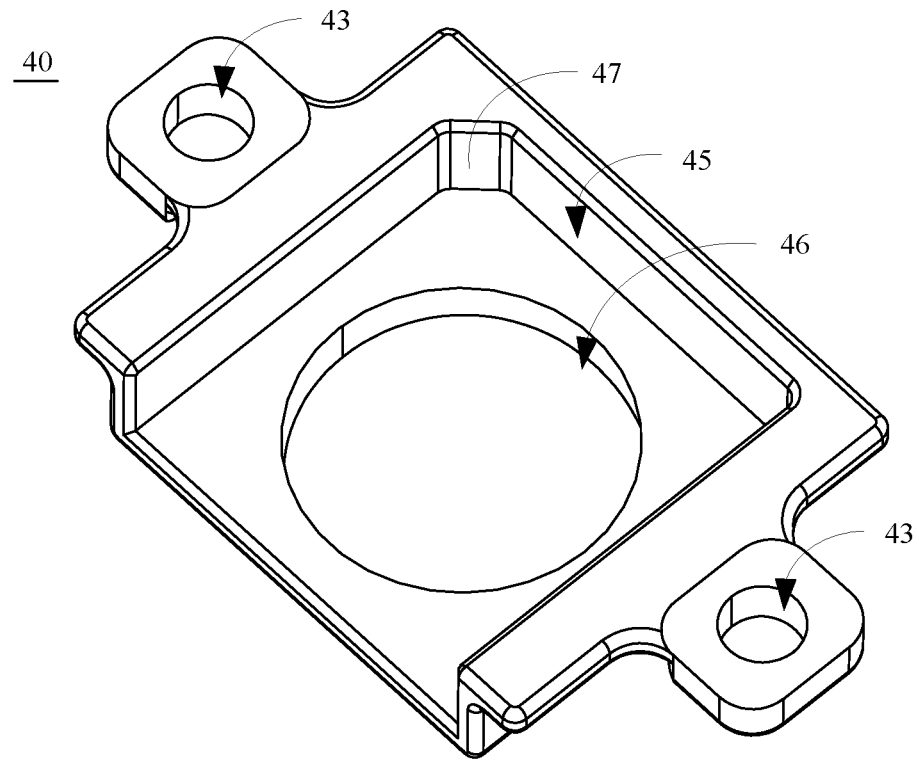
FIG. 20 is a schematic diagram of an example of a camera support according to an embodiment of this application.
Figure 21:
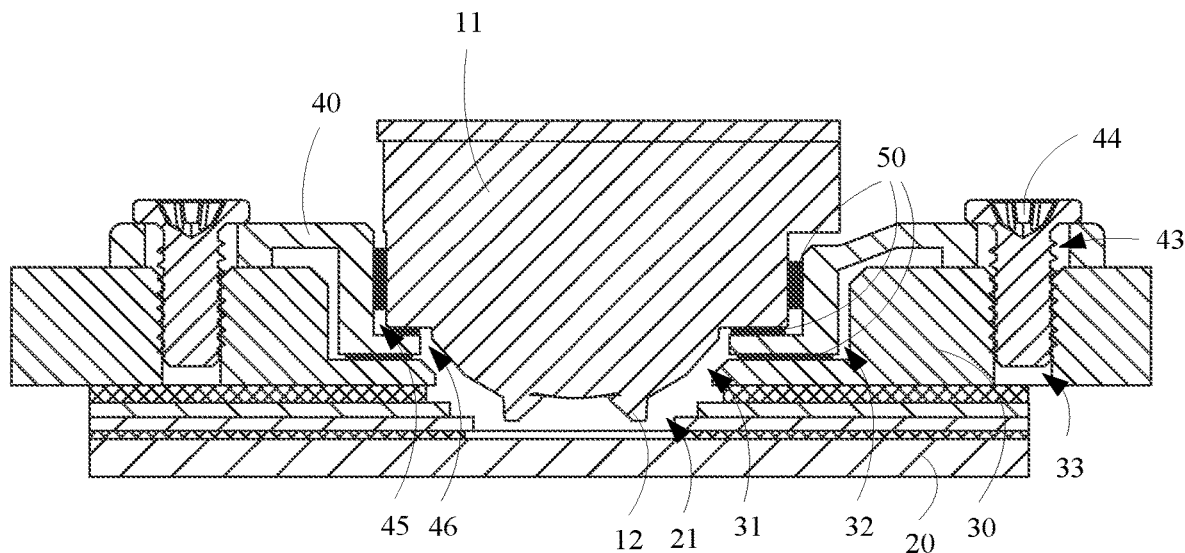
FIG. 21 is a sectional view of another example of the front camera assembling structure according to an embodiment of this application.

FIG. 20 is a schematic diagram of an example of the camera support 40 according to an embodiment of this application. FIG. 21 is a sectional view of another example of the front camera assembling structure according to an embodiment of this application.

As shown in FIG. 20 and FIG. 21, in an embodiment provided in this application, the camera support 40 includes a concave receiving groove 45. A bottom groove wall of the receiving groove 45 is provided with an avoidance hole 46 for avoiding the lens 12. The camera body 11 is fastened in the receiving groove 45. After successively passing through the avoidance hole 46 and a hole channel 31, the lens 12 of the camera body 11 extends into the camera hole 21 and is disposed in a centering manner. An outer side of a groove wall of the receiving groove 45 is fastened in an accommodation groove 32.

In this embodiment, the camera support 40 is fastened to the middle frame 30, to fasten the camera body 11 in the accommodation groove 32. In this fastening manner, the camera support 40 is directly fastened, and direct contact with the camera body 11 may be prevented, preventing damage to the camera body 11 during fastening, and reducing an object loss during assembling.

In an embodiment provided in this application, a size of the outer side of the groove wall of the receiving groove 45 is smaller than a size of the accommodation groove 32, to enable the camera support 40 to have an adjustment allowance relative to the middle frame 30.

In this embodiment, because the size of the outer side of the groove wall of the receiving groove 45 is less than the size of the accommodation groove 32, the receiving groove 45 may be displaced in a horizontal direction in the accommodation groove 32, enabling the camera support 40 to have an adjustment allowance in the horizontal direction relative to the middle frame 30 when the lens 12 and the camera hole 21 are adjusted in a centering manner.

The outer side of the groove wall of the receiving groove 45 is fastened in the accommodation groove 32 in a plurality of manners, for example, the fastening may be implemented in a manner in which the camera support 40 is connected to the middle frame 30 by using fasteners 44. As shown in FIG. 21, in an embodiment provided in this application, two ends of the camera support 40 are provided with first installation holes 43, the middle frame 30 is provided with second installation holes 33 corresponding to the first installation holes 43, and the fasteners 44 are disposed in the first installation hole 43 and the second installation hole 33 to fasten the camera support 40 to the middle frame 30. In this case, the outer side of the groove wall of the receiving groove 45 is fastened in the accommodation groove 32.

Alternatively, the outer side of the groove wall of the receiving groove 45 is bonded and fastened in the accommodation groove 32 by an adhesive 50. As shown in FIG. 21, in an embodiment provided in this application, the adhesive 50 is filled between the outer side of the groove wall of the receiving groove 45 and a groove wall of the accommodation groove 32 to bond and fasten the receiving groove 45 and the accommodation groove 32.

Alternatively, both bonding by using the adhesive 50 and connection by using the fasteners 44 may be used simultaneously.

Design of the fasteners 44 and the second installation holes 33 are similar to design of the fasteners 44 and the second installation holes 33 in the previous embodiment. Details are not described herein again.

In an embodiment provided in this application, an aperture of the first installation hole 43 is larger than an aperture of the second installation hole 33, to enable the camera support 40 to have an adjustment allowance relative to the middle frame 30.

Figure 22:
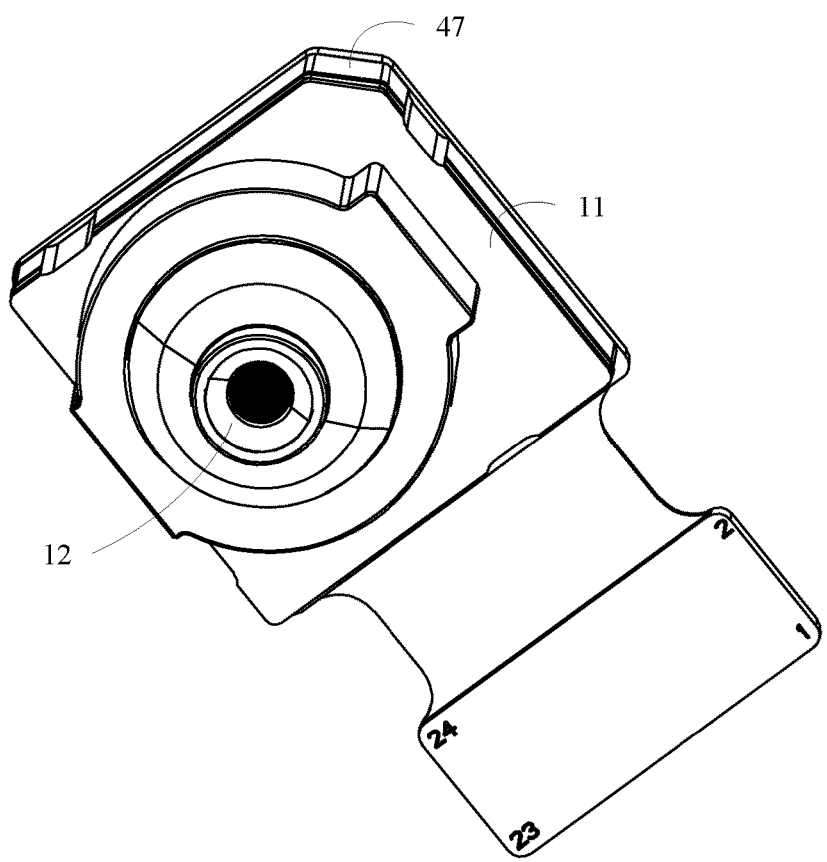
FIG. 22 is a schematic diagram of an example of a camera body according to an embodiment of this application.
Figure 23:
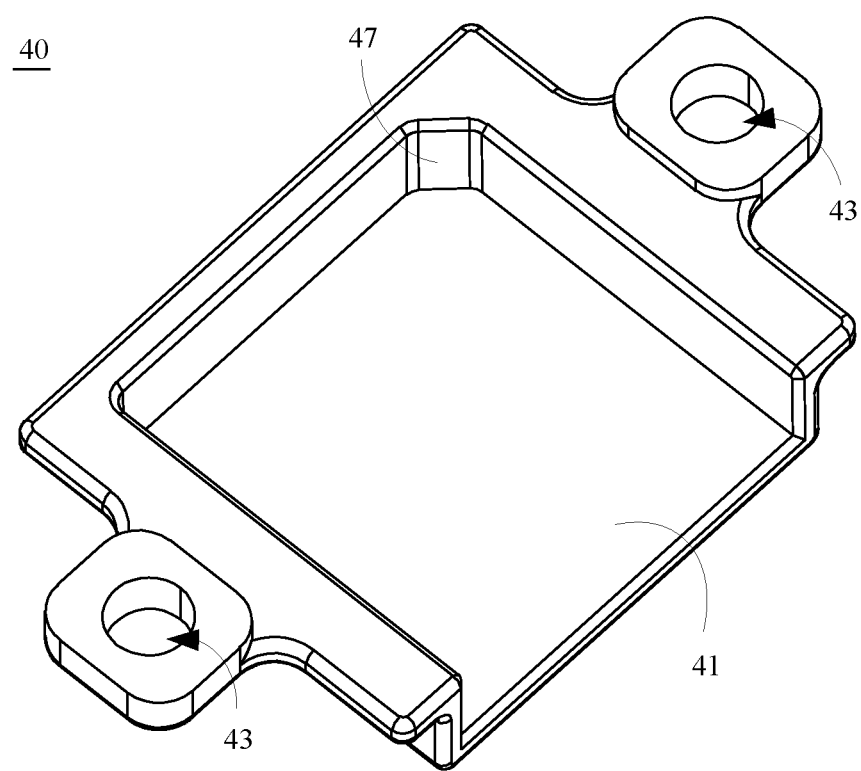
FIG. 23 is a schematic diagram of another example of the camera support according to an embodiment of this application.

FIG. 22 is a schematic diagram of an example of the camera body 11 according to an embodiment of this application. FIG. 23 is a schematic diagram of another example of the camera support 40 according to an embodiment of this application.

As shown in FIG. 20, FIG. 22, and FIG. 23, in an embodiment provided in this application, an error-proof mechanism 47 is provided on the camera support 40 and the camera body 11.

When the camera support 40 and the camera body 11 are assembled, assembly efficiency and precision can be improved.

An embodiment of this application further provides an electronic device. The electronic device includes the foregoing assembling structure.

The electronic device may be a mobile phone shown in FIG. 1. Different from an electronic device in the related technology, the front camera assembling structure provided in an embodiment of this application is disposed in a housing 60 of the mobile phone.

In addition, the electronic device may alternatively be any one of a notebook computer, a tablet computer, and an electronic watch.

Because the foregoing front camera assembling structure is used for the electronic device provided in this embodiment of this application, the lens black edge 70 of the front camera of the electronic device is smaller, the screen-to-body ratio is higher, and requirements for size precision and installation precision of parts are also relatively low, reducing overall difficulties in processing and assembling the electronic device and reducing manufacturing costs.

Finally, it should be noted that the foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A front camera assembling method, comprising:
providing a middle frame, wherein the middle frame is provided with an accommodation groove that accommodates a camera body, a size of the accommodation groove meets a centering adjustment allowance that is of a lens of the camera body and a camera hole of a touchscreen and that exists when the camera body is assembled;
assembling the middle frame and the touchscreen into an integral structure, wherein the integral structure is provided with a hole channel connecting the accommodation groove and the camera hole; and
moving the camera body by using a visual positioning system, to enable the lens to extend into the camera hole through the hole channel and to be disposed in a centering manner, and fastening the camera body in the accommodation groove, wherein the visual positioning system comprises a mobile platform, a suction apparatus driven by the mobile platform to move the camera body, and a visual positioning apparatus coupled to the mobile platform and the suction apparatus for image processing.

2. The assembling method according to claim 1, wherein a step of the fastening the camera body in the accommodation groove comprises:
bonding and fastening the camera body in the accommodation groove.

3. The assembling method according to claim 1, wherein a step of the moving the camera body by using a visual positioning system, to enable the lens to extend into the camera hole through the hole channel and to be disposed in a centering manner, and fastening the camera body in the accommodation groove comprises:
fastening the camera body to a camera support; and
moving the camera support and the camera body by using the visual positioning system, to enable the lens to extend into the camera hole through the hole channel and to be disposed in a centering manner, and fastening the camera support to the middle frame, to enable the camera body to be fastened in the accommodation groove.

4. The assembling method according to claim 3, wherein a step of the fastening the camera body to a camera support comprises:
bonding and fastening the camera body in an accommodation housing formed by a middle part that is of the camera support and that is convex.

5. The assembling method according to claim 4, wherein a step of the fastening the camera support to the middle frame comprises:
bonding and fastening the camera support to the middle frame.

6. The assembling method according to claim 5, wherein two ends of the camera support are provided with first installation holes, the middle frame is correspondingly provided with second installation holes, and a step of the fastening the camera support to the middle frame comprises:
disposing fasteners in the first installation hole and the second installation hole to fasten the camera support to the middle frame.

7. The assembling method according to claim 3, wherein a step of the fastening the camera support to the middle frame comprises:
bonding and fastening the camera support to the middle frame.

8. The assembling method according to claim 7, wherein two ends of the camera support are provided with first installation holes, the middle frame is correspondingly provided with second installation holes, and a step of the fastening the camera support to the middle frame comprises:
disposing fasteners in the first installation hole and the second installation hole to fasten the camera support to the middle frame.

9. The assembling method according to claim 3, wherein a middle part of the camera support is concave to form a receiving groove, and a bottom groove wall of the receiving groove is provided with an avoidance hole, and a step of the fastening the camera body to a camera support comprises:
enabling the lens to pass through the avoidance hole, and then bonding and fastening the camera body in the receiving groove.

10. The assembling method according to claim 9, wherein a step of the fastening the camera support to the middle frame comprises:
bonding and fastening an outer side of a groove wall of the receiving groove in the accommodation groove.

11. The assembling method according to claim 10, wherein two ends of the camera support are provided with first installation holes, the middle frame is correspondingly provided with second installation holes, and the step of the fastening the camera support to the middle frame comprises:
disposing fasteners in the first installation hole and the second installation hole to fasten the camera support to the middle frame.

12. The assembling method according to claim 9, wherein two ends of the camera support are provided with first installation holes, the middle frame is correspondingly provided with second installation holes, and the step of the fastening the camera support to the middle frame comprises:
disposing fasteners in the first installation hole and the second installation hole to fasten the camera support to the middle frame.

13. A front camera assembling structure, comprising:
a camera body, comprising a lens located at a front end;
a touchscreen, provided with a camera hole for accommodating the lens; and
a middle frame, fastened to the touchscreen, wherein the middle frame is provided with an accommodation groove whose size meets a requirement for adjusting the lens and the camera hole in a centering manner, the accommodation groove communicates with the camera hole through a hole channel, the camera body is fastened in the accommodation groove, and the lens passes through the hole channel and is disposed in the camera hole in a centering manner based on moving the camera body by using a visual positioning system, wherein the visual positioning system comprises a mobile platform, a suction apparatus driven by the mobile platform to move the camera body, and a visual positioning apparatus coupled to the mobile platform and the suction apparatus for image processing.

14. The assembling structure according to claim 13, further comprising:
a camera support, wherein the camera body is fastened to the middle frame by using the camera support.

15. The assembling structure according to claim 14, wherein a middle part of the camera support comprises a convex accommodation housing, and the camera body is fastened in the accommodation housing.

16. The assembling structure according to claim 15, wherein edges of two ends of the camera support comprise inwardly flanged edges, and an adhesive is disposed on inner sides of the inwardly flanged edges to bond and fasten the camera support to the middle frame.

17. The assembling structure according to claim 16, wherein the inwardly flanged edges are disposed to be half-circled on the edges of the ends of the camera support to surround the adhesive; and
two ends of the camera support are provided with first installation holes, the middle frame is provided with second installation holes corresponding to the first installation holes, and fasteners are disposed in the first installation hole and the second installation hole to fasten the camera support to the middle frame; and
an aperture of the first installation hole is larger than an aperture of the second installation hole, to enable the camera support to have an adjustment allowance relative to the middle frame; and
a heat conductive agent is filled in a gap between the accommodation housing and the camera body.

18. The assembling structure according to claim 14, wherein a middle part of the camera support is provided with a concave receiving groove, a bottom groove wall of the receiving groove is provided with an avoidance hole for avoiding the lens, the camera body is fastened in the receiving groove, and an outer side of a groove wall of the receiving groove is fastened in the accommodation groove; and
a size of the outer side of the groove wall of the receiving groove is smaller than a size of the accommodation groove, to enable the camera support to have an adjustment allowance relative to the middle frame; and
two ends of the camera support are provided with first installation holes, the middle frame is provided with second installation holes corresponding to the first installation holes, and fasteners are disposed in the first installation hole and the second installation hole to fasten the camera support to the middle frame; and an aperture of the first installation hole is larger than an aperture of the second installation hole, to enable the camera support to have an adjustment allowance relative to the middle frame.

19. A front camera assembling method, comprising:
providing a middle frame, wherein the middle frame is provided with an accommodation groove that accommodates a camera body, a size of the accommodation groove meets a centering adjustment allowance that is of a lens of the camera body and a camera hole of a touchscreen and that exists when the camera body is assembled;
assembling the middle frame and the touchscreen into an integral structure, wherein the integral structure is provided with a hole channel connecting the accommodation groove and the camera hole;
fastening the camera body to a camera support; and
moving the camera support and the camera body by using the visual positioning system, to enable the lens to extend into the camera hole through the hole channel and to be disposed in a centering manner, and fastening the camera support to the middle frame, to enable the camera body to be fastened in the accommodation groove, wherein the visual positioning system comprises a mobile platform, a suction apparatus driven by the mobile platform to move the camera body, and a visual positioning apparatus coupled to the mobile platform and the suction apparatus for image processing.

20. The assembling method according to claim 19, wherein a step of the fastening the camera body to a camera support comprises:
bonding and fastening the camera body in an accommodation housing formed by a middle part that is of the camera support and that is convex.

* * * * *